United States Patent [19]

Bruckner et al.

[11] 4,356,542

[45] Oct. 26, 1982

[54] DIGITAL CONTROLLER

[75] Inventors: Ronald L. Bruckner, Longwood; Ishwar S. Khamare, Fern Park; Joseph L. Voyer, Longwood; Rodney V. Hamilton; Paul Gheorghiu, both of Orlando, all of Fla.

[73] Assignee: NCR Corporation, Dayton, Ohio

[21] Appl. No.: 242,788

[22] Filed: Mar. 11, 1981

[51] Int. Cl.³ .......................................... H02M 3/335
[52] U.S. Cl. ...................................... 363/26; 363/97; 323/267; 323/283
[58] Field of Search .................................. 363/22–26, 363/41, 55–56, 97–98, 133, 134; 323/267, 274, 283–285

[56] References Cited

U.S. PATENT DOCUMENTS

| | | | |
|---|---|---|---|
| 3,614,587 | 10/1971 | Schwarz | 363/56 X |
| 3,657,631 | 4/1972 | Martens et al. | 363/26 |
| 3,970,919 | 7/1976 | Butcher | 323/283 |
| 4,095,165 | 6/1978 | Boros | 323/283 |
| 4,109,194 | 8/1978 | Miller | 323/283 |
| 4,128,771 | 12/1978 | Domenico | 323/283 X |
| 4,166,247 | 8/1979 | Miyazawa | 363/41 X |

Primary Examiner—William M. Shoop
Assistant Examiner—Peter S. Wong
Attorney, Agent, or Firm—J. T. Cavender; Wilbert Hawk, Jr.; Richard W. Lavin

[57] ABSTRACT

A digital controller includes a digital feedback circuit for use in generating a pulse-width modulated control signal. The signal is derived from binary signals representing a standard pulse-width signal for the rated output of the power supply plus a correction pulse-width signal reflecting the change in the output level of the power supply. Logic circuits alter the correction pulse-width signals to provide a balancing correction. Soft start operation of the power supply together with a selection of operating clock frequencies are also provided.

19 Claims, 29 Drawing Figures

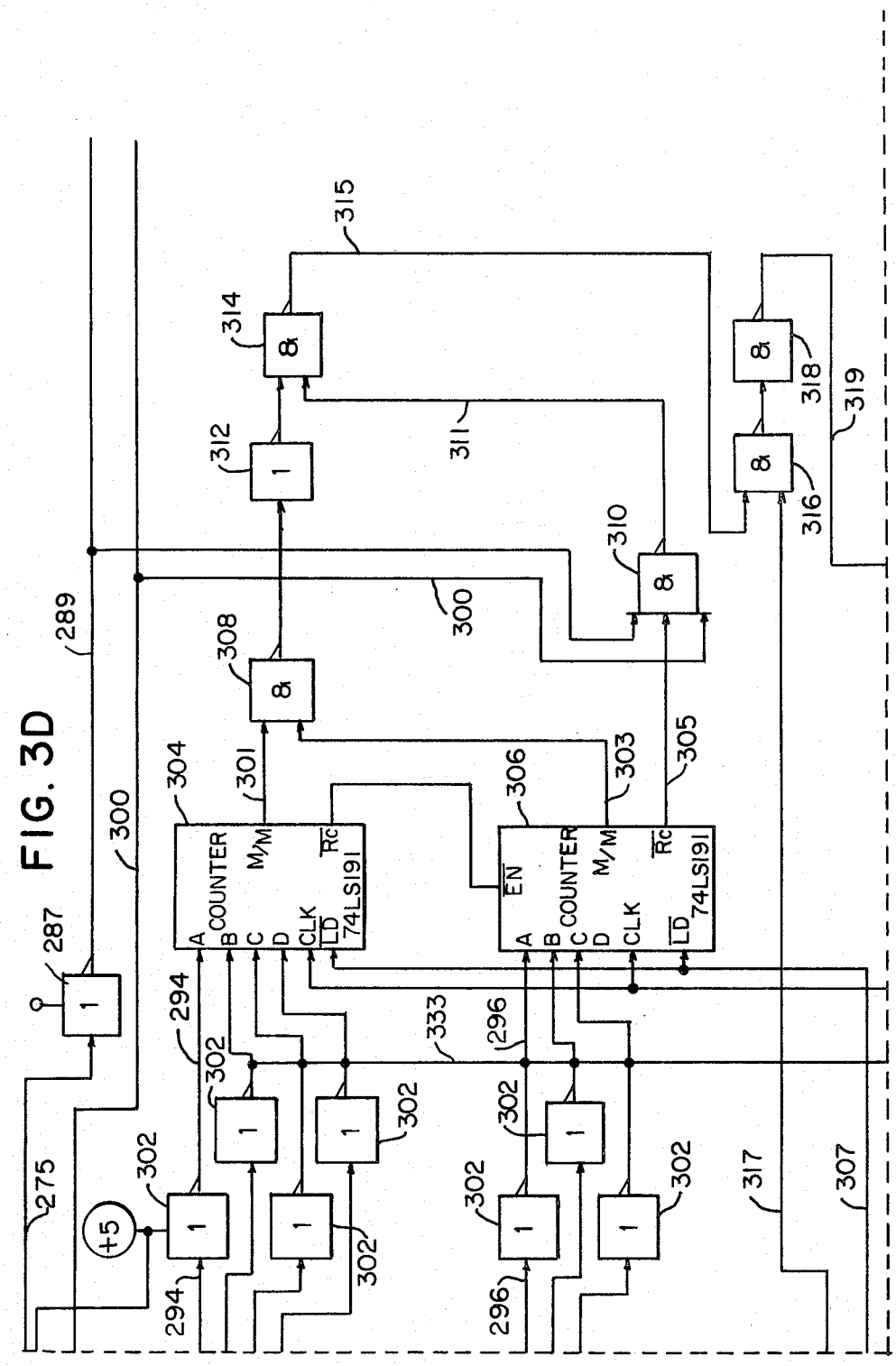

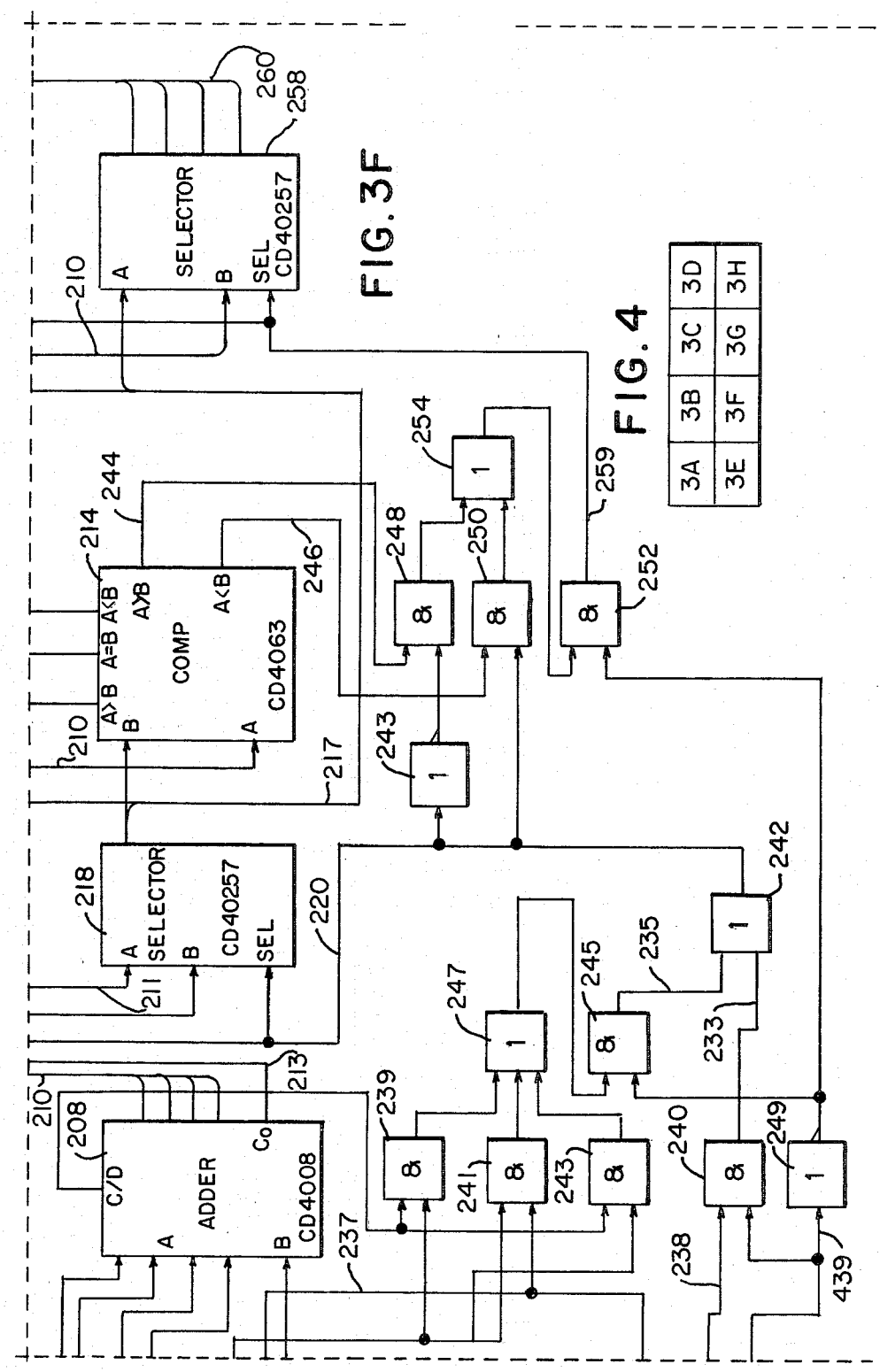

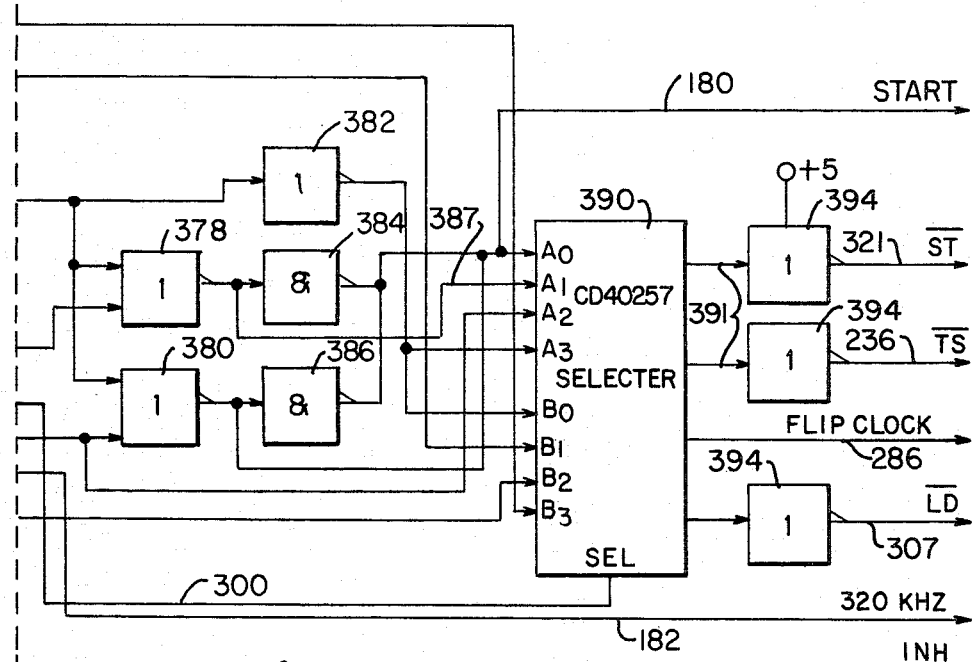
FIG. 5B
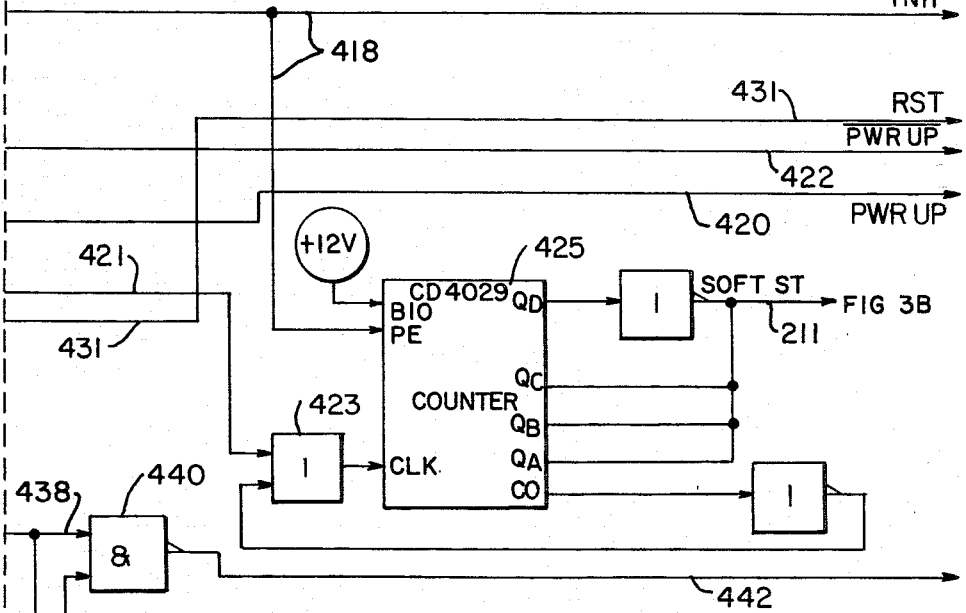
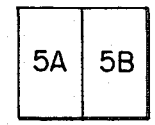
FIG. 6

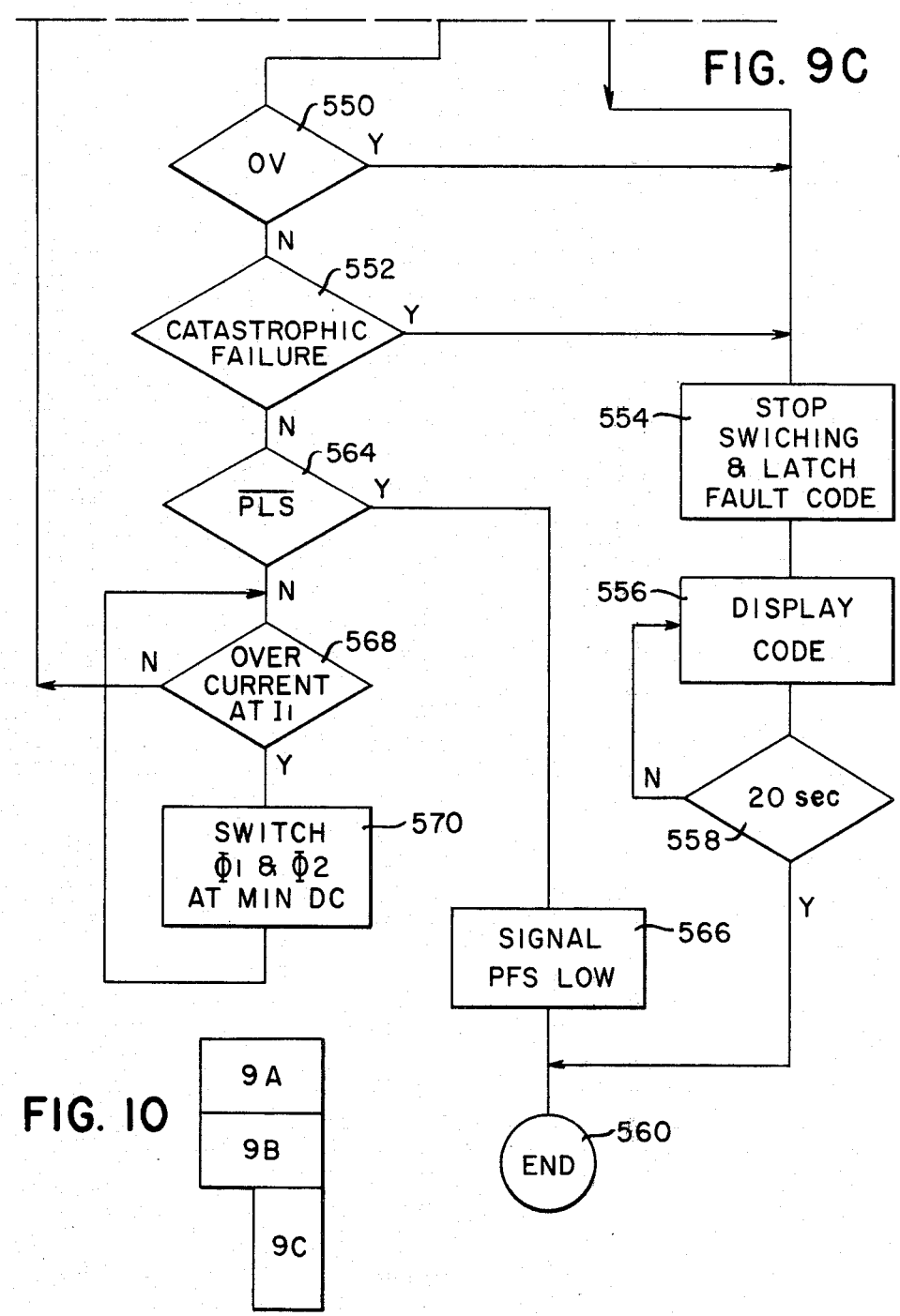

FIG.11A $B_{S1}$ 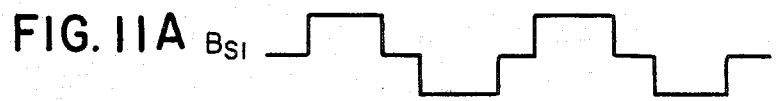
FIG.11B $B_{S2}$ 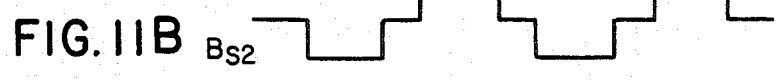
FIG.11C $V_{B1}$ 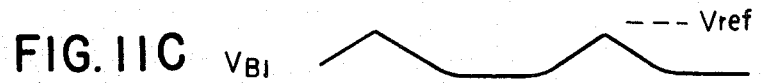
FIG.11D $V_{B2}$ 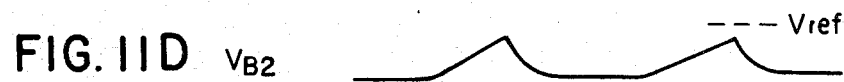
FIG.11E
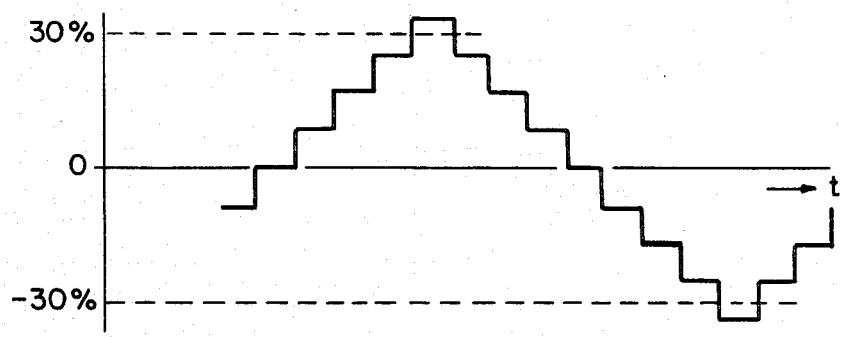
FIG.12A $\phi_1$ 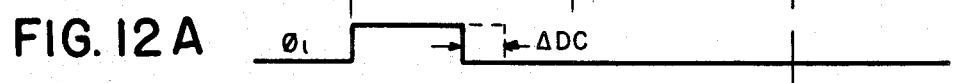
FIG.12B $\phi_2$ 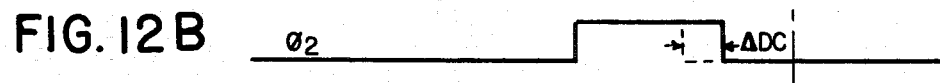
FIG.12C FLIP CLOCK 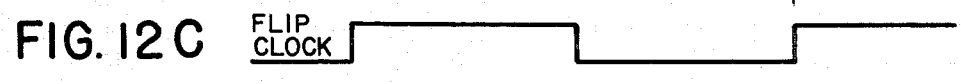

DIGITAL CONTROLLER

CROSS-REFERENCE TO RELATED APPLICATIONS

Power supply diagnostic system, co-pending application Ser. No. 242,520 filed on even date herewith, invented by Ishwar S. Khamare and Rodney V. Hamilton.

BACKGROUND OF THE INVENTION

The invention relates to power supplies in general and more particularly, it relates to a digital controller for controlling the operation of a multilevel power supply system.

Traditionally, off-line analog switching regulators designs have resulted in a high component count which adversely affects the reliability, package size and overall cost. Analog feedback control systems experience both short and long term stability problems because of component drift. Secondly, each output voltage to be regulated requires a dedicated analog control system. This means that power systems which produce multiple, independent, regulated output voltages must have an independent analog controller for each voltage, since many contemporary applications require three to five independent voltages, while duplicated analog circuitry contributes significantly to the cost of their power systems. Analog systems are not flexible enough to adapt to widely varying applications.

An ideal feedback control system would be one that could incorporate the advantages of proportional and derivative control for multiple, independent, regulated output voltages at low cost in a simple implementation that is relatively independent of component drift and would adapt to different needs. It is therefore an object of this invention to provide a system controller for a power supply which is digital in construction enabling the controller to be incorporated into a single LSI circuit chip. It is a further object of this invention to provide a digital controller for a power supply which utilizes pulse width modulation control for the power supply regulation. It is another object of this invention to disclose a digital controller for a power supply which provides proportional/derivative control for minimizing the effect of static and dynamic load changes of the regulated power levels of the power supply, together with an "anticipatory" control for minimizing the effect of dynamic line changes in the power supply. It is still another object of this invention to provide a digital controller for a power supply which protects the power supply from the catastrophic failure of an element in the power supply. A further object of this invention is to provide a digital constructed power supply controller incorporated into an LSI chip which is simple in construction and therefore low in cost.

SUMMARY OF THE INVENTION

In order to carry out these objects, there is disclosed a digital controller for a power supply which in response to receiving feedback signals representing the output of the power supply, will generate pulse-width modulating signals for instantaneously altering the duty cycle of the clocking signals for a pair of switching transistors to compensate for variations in the output level of the power supply. The pulse-width words are modified by balance signals which correct for a long-term imbalance in the transformer. The controller will shut down the power supply system upon sensing the output voltage level rising above a predetermined voltage threshold level and will output minimum pulse-width signals so long as the current output of the system rises above a predetermined current level. A plurality of switching frequencies are selectively provided by the controller to accommodate various chip technologies employed in the construction of the controller.

BRIEF DESCRIPTION OF THE DRAWINGS

Additional advantages and features of the present invention will become apparent and fully understood from a reading of the following description, taken together with the annexed drawings, in which:

FIGS. 3A-3H inclusive taken together, disclose the logic circuits for generating the pulse-width modulated control signals used in regulating the output level of one of the power output sections of the power supply;

FIG. 4 is a diagram showing the manner in which FIGS. 3A-3H inclusive are arranged with respect to each other to form the logic circuits;

FIGS. 5A and 5B taken together, disclose the logic circuits for generating the timing and clock signals used in regulating the power supply;

FIG. 6 is a diagram showing the manner in which FIGS. 5A and 5B are arranged with respect to each other to form the logic circuits;

FIGS. 9A-9C inclusive taken together disclose a flowchart of the operation of the controller in accordance with the present invention;

FIG. 10 is a diagram showing the manner in which FIGS. 9A-9C inclusive are arranged with respect to each other to form the flowchart;

FIGS. 11A-11E inclusive show various wave shapes and an $I_M$ curve associated with the preferred embodiment.

FIGS. 12A-12C inclusive show various wave shapes associated with the preferred embodiment.

DESCRIPTION OF THE PREFERRED EMBODIMENT

Figure 1A:
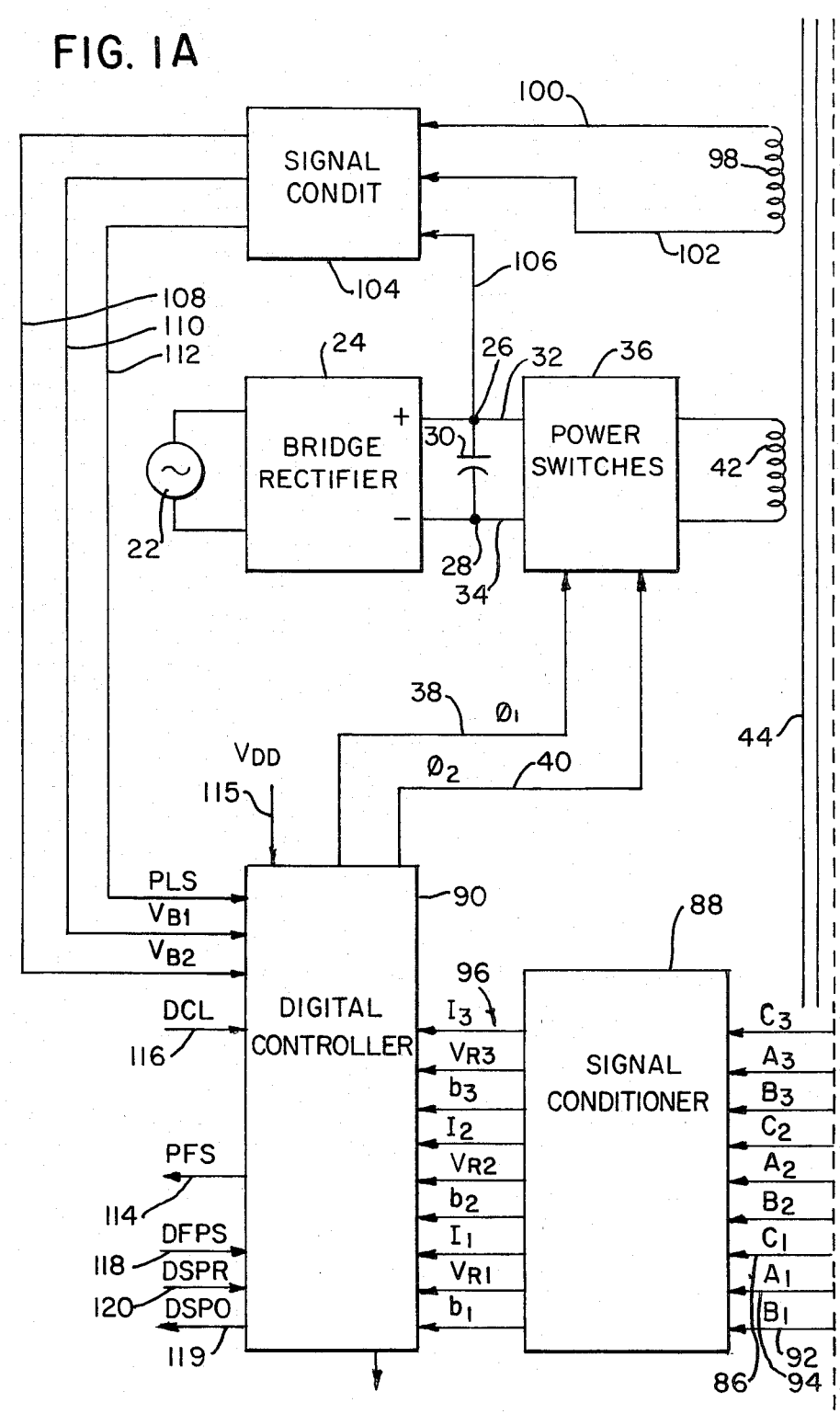
FIGS. 1A and 1B taken together disclose a block diagram of the power supply system which includes the digital controller of the present invention showing the output voltage levels of the system.
Figure 1B:
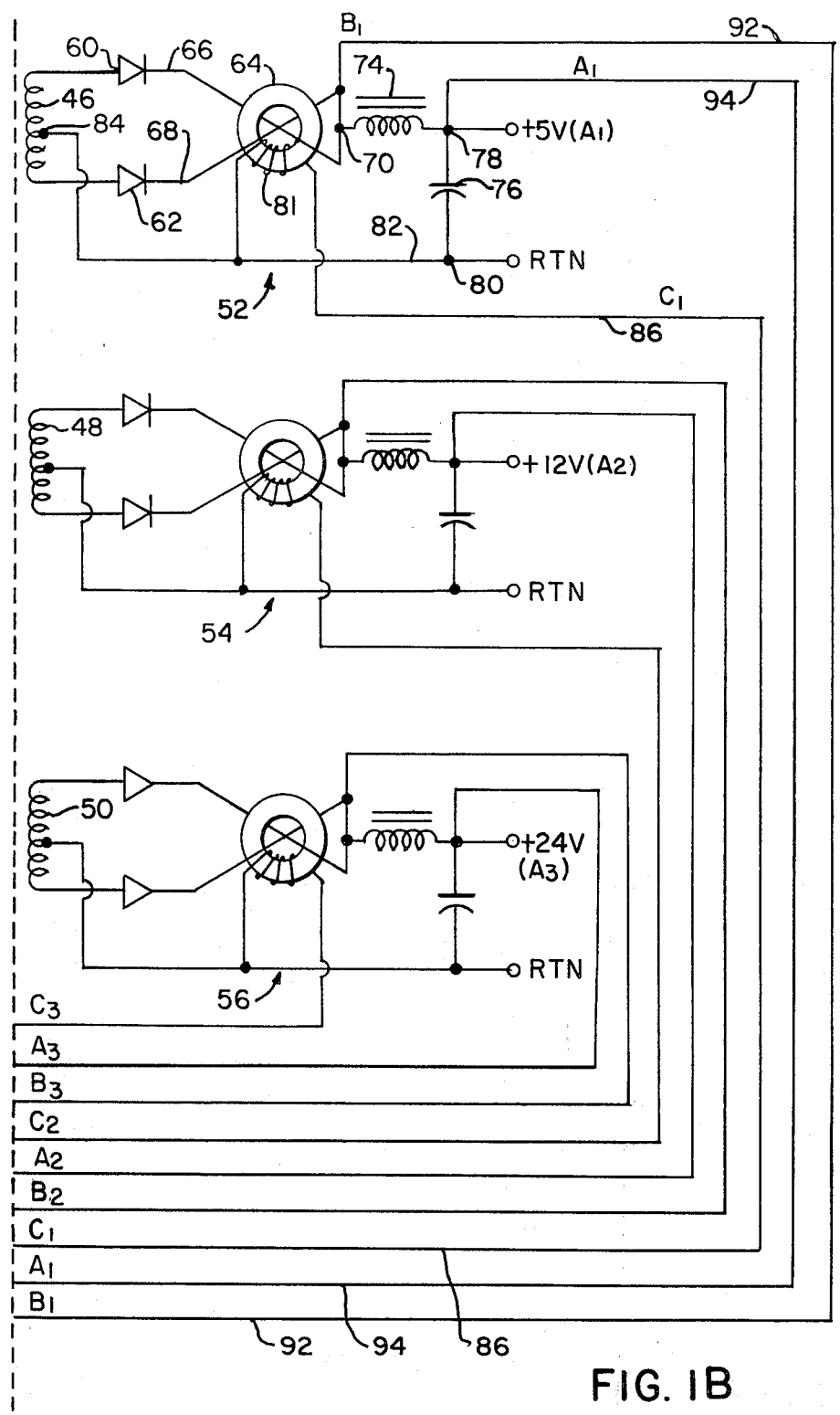

Referring now to FIGS. 1A and 1B, there is shown a partial block diagram and schematic of a regulated power supply which incorporates digital devices including the digital controller of the present invention. The power supply includes an A.C. input 22 (FIG. 1A) coupled to a conventional full-wave bridge rectifier 24. Also included in the power supply are the terminals 26 and 28 shunted by a filter capacitor 30 in a manner that is well-known in the art to provide the D.C. output at the positive and negative terminals 26 and 28 respectively. Connected to the terminals 26 and 28 by means of conductors 32 and 34 are conventional power switches 36 comprising switching transistors (not shown) which are operated 180° out of phase by switching control signals $\phi1$ and $\phi2$ appearing on the conductors 38 and 40 to alternatively drive the upper and lower half winding of the primary windings 42 of the transformer 44. As will be explained more fully hereinafter, the regulation of the power supply output level appearing at the primary windings 42 of the transformer 44 will be controlled by altering the duty cycle of the Q1 and ⌀2 control signals appearing on the conductors 38 and 40.

Associated with the transformer 44 are three secondary windings 46–50 inclusive (FIG. 1B), each associated with a power output circuit generally indicated by the numerals 52–56 inclusive. The circuit 52 will have a power output of 5 volts, the circuit 54 will output 12 volts while the circuit 56 will output 24 volts. Since each of these power output circuits are of the same construction, only circuit 52 will now be described in detail. In a manner that is well-known in the art, each of the power output circuits 52–56 inclusive includes a full-wave rectifier circuit including the rectifying diodes 60 and 62 and a current sensing transformer 64 coupled to the output of the diodes 60 and 62 by means of conductors 66 and 68 for generating the magnetic flux in the transformer 64. The conductors 66 and 68 are connected to a terminal 70 at which will appear a voltage level $B_1$. As seen in FIG. 1B, connected to the terminal 70 is a power filter circuit comprising a choke 74 and a capacitor 76. The choke 74 is connected to an output terminal 78 at which appears the voltage level $A_1$ of the output circuit. The capacitor 76 is shunted across the terminal 78 and a terminal 80 connected to a ground conductor 82. The conductor 82 is connected to the center tap 84 of the transformer 44.

The current sensing transformer 64 has associated therewith a secondary winding 81 connected to ground through the conductor 82. The other end of the transformer 64 is connected over conductor 86 to a signal conditioner 88 comprising a plurality of R.C. circuits which reduce proportionately the level of the input signal appearing on the conductor 86 to a voltage level which may be used by the CMOS circuit elements located in a digital controller 90. Appearing on conductor 86 is a signal $C_1$ representing the level of the current flowing in the transformer 64 and which is transmitted to the signal conditioner 88. As shown in FIG. 1B, the voltage level signals $B_1$ appearing at the terminal 72 are transmitted to the signal conditioner 88 over conductor 92 while the voltage level signals $A_1$ appearing at the terminal 78 are transmitted over conductor 94 to the conditioner 88. In a similar manner, the current and voltage level signals of the power output circuits 54 and 56 are also connected to the conditioner 88. The resulting voltage signals $V_{RI}$, $b_1$ and $I_1$ (FIG. 1A) generated by the conditioner 88 and representing the input signals $A_1$, $B_1$ and $C_1$ respectively of the circuit 52 are transmitted over conductors 96 to the digital controller 90, enabling the controller to regulate the output of the power supply in accordance with the signals received from the conditioner 88.

As shown in FIG. 1A, the transformer 44 has disposed thereon a secondary winding 98 which is connected by means of conductors 100 and 102 to a second signal conditioner 104 which is similar in construction and operates in the same manner as that of the signal conditioner 88. The secondary windings 98 will generate a pair of balance signals $B_{S1}$ (FIG. 11A) and $B_{S2}$ (FIG. 11B) over the conductors 100 and 102, representing the voltage level developed in the transformer 44. These signals, as will be described more fully hereinafter, will be used in reducing the effect of the magnetizing current flow in the transformer 44 due to the unequal volt-second drive from the operation of the switching transistors 36. Also connected to the signal conditioner 104 is a conductor 106 connected to the terminal 26 from which a power loss signal (PLS) is generated representing the condition of a bulk voltage level of 150 volts to 300 volts developed at the output of the rectifier 24. This signal is used by the digital controller 90 in detecting a power failure. The signal conditioner 104 will output the balance signals $V_{B1}$ (FIG. 11C) and $V_{B2}$ (FIG. 11D) over conductors 108 and 110 and the signal PLS over conductor 112 to the digital controller 90. The controller 90 in response to the signals appearing on the conductors 108–112 inclusive will then enter into a power up sequence characterized as a "soft start sequence" enabling the operation of the power supply to start in a manner that will be described more fully hereinafter. Prior to receiving the signal PLS, the controller 90 is reset at this time. When the signal PLS goes high, indicating that the output voltage level of the rectifier 24 has reached 78% of its normal value, the power signal $V_{DD}$ appearing on conductor 115 is connected to the remainder of the controller 90 enabling the controller for operation.

After being reset, the controller will initiate a delay of 60 ms. or 3 power line cycles. When the delay is complete, the switching control signals ⌀1 and ⌀2 appearing on the conductors 38 and 40 and which are generated in the digital controller 90 will begin switching at a minimum duty cycle period which duty cycle period will be incrementally increased after a predetermined time period has elapsed. This switching action will continue until an overcurrent is detected in the transformer 64 (FIG. 1B). Upon the detection of an overcurrent condition, the signals ⌀1 and ⌀2 will start switching at a second predetermined or constant minimum duty cycle until the overcurrent condition is removed at which time the signals ⌀1 and ⌀2 will resume switching at the duty cycle existing prior to the detection of the overcurrent condition. This soft start operation continues until the voltage level $A_1$ appearing at the terminal 78 in the power output circuit 52 reaches 90% of its normal value or until 100 ms. from the beginning of the switching operation has elapsed, whichever occurs first. If the predetermined voltage level $A_1$ occurring at terminal 78 is reached first, the controller continues its soft start operation for another 20 ms. (or 1 power line cycle) and then commences a regulation mode of operation.

When the controller is operating in the regulation mode, the duty cycle of the switching signals ⌀1 and ⌀2 are continuously adjusted based on the voltage levels $A_1$ and $B_1$ appearing at the terminals 70 and 78 respectively in the power output circuit 52 to maintain a plus or minus 1 percent static regulation and plus or minus 2 percent dynamic regulation of the power output circuit 52 (FIG. 1B). During the regulation mode, the controller continuously monitors the feedback data generated by the signal conditioner 88 and will stop the generation of the signals ⌀1 and ⌀2 upon sensing the occurrence of a system fault. At this time, the controller will disconnect its own power, leaving a diagnostic data latch and the circuitry associated with the signal PLS operational. The diagnostic data latch will be accessible by a serviceman at a later time. As disclosed in the previously cited co-pending application of Khamare et al., Ser. No. 242,520 the controller shall have the capability to display the fault isolation condition on a plurality of lightemitting diodes for a period of 20 seconds when enabled.

As will be described more fully hereinafter, the controller 90 will output a high signal PFS (power fail sense) over conductor 114, (FIG. 1A), indicating the occurrence of a power loss. The controller 90 will also receive a manually selected signal DCL over conductor 116 selecting either a single ended or double ended rectification mode of operation of the power system. When selected for a single ended operation, the maximum duty cycle of the switching signals $\phi_1$ or $\phi_2$ shall be reduced to 66 percent of their value in the double ended operation. A manually selected signal DFPS appearing on conductor 118 selects either a 20 KHz. or 40 KHz. switching frequencies while a signal DSPR appearing on conductor 120 is a reset signal to the serial readout diagnostic output latches (not shown). For a complete disclosure of the diagnostic circuitry associated with the controller 90, reference should be made to the previously cited corresponding application Ser. No. 242,520 of Khamare et al.

Figure 2:
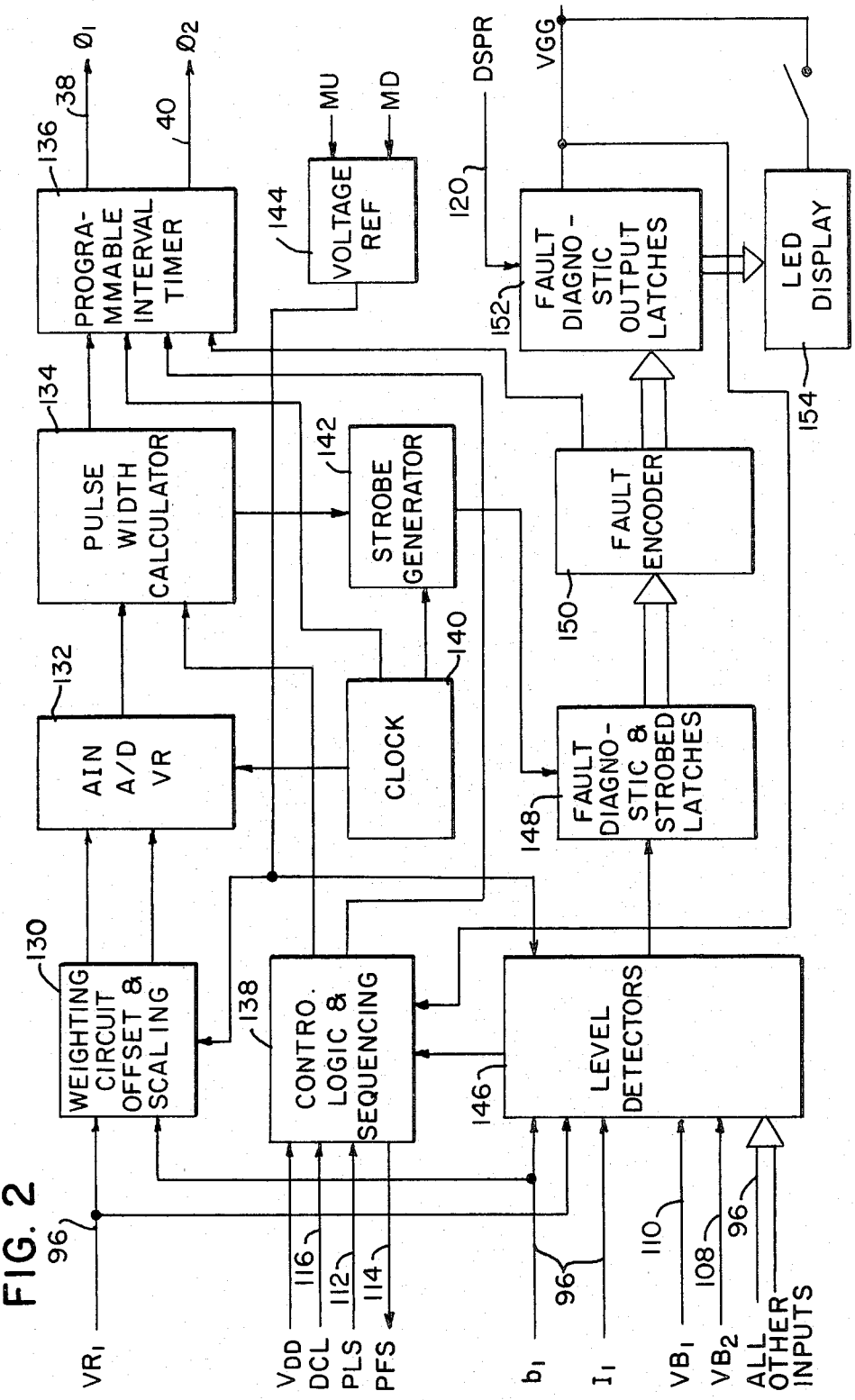
FIG. 2 is a block diagram of the digital controller of the present invention.

Referring now to FIG. 2, there is shown a block diagram of the digital controller 90. The controller 90 will regulate the power supply output by altering the duty cycle of the $\phi_1$ and $\phi_2$ signals for the power transistor switches 36 (FIG. 1A). This information is contained in the power level signals $A_1$ and $B_1$ appearing at the terminals 78 and 70 of the power level circuit 52 (FIG. 1B). By monitoring the power supply output voltage present at these terminals, the controller can adjust the $\phi_1$ and $\phi_2$ duty cycle up or down to counteract the change in the output voltage of the power output circuit 52 (FIG. 1B). The linear control equation used in the present embodiment is given as follows:

$$TPW = T_0 + T_3$$

where TPW is a calculated total pulse width; $T_0$ is equal to a nominal pulse width for the given power supply and $T_3$ is equal to a pulse width correction.

The nominal pulse width $T_0$ which is fixed for the given supply which in this present embodiment is 5 volts, can be calculated by the following equation:

$$V_{OR} = V_{IN} \times DC$$

and DC is equal to $T_{ON}/T$.
where
$V_{OR}$ is equal to the output voltage to be regulated;
$V_{IN}$ is equal to the input voltage to the power filter appearing at the terminal 70 (FIG. 1B);
DC is equal to the duty cycle;
$T_{ON}$ is equal to on time; and
T is equal to switching period.
For a 5 volt power supply with a 12 volt input, DC is equal to 5/12 = 0.4166 = 41.66%

And for 40 KHz. (25 microseconds) switching frequency, the nominal pulse width, $T_0$ which is equal to $T_{ON} = 0.4166 \times 25$ microseconds which is equal to 10.415 microseconds.

The pulse width correction $T_3$ is calculated by:

$$T_3 = -K_1(d - d_0) - K_2(d - d_1)$$

where:

$K_1$ and $K_2$ are scaling factors which in the present embodiment are represented by 2 and 8 respectively;
$d_0$ is equal to the digital equivalent of the output voltage to be regulated which in the present embodiment is 5 volts;
d is equal to the digital equivalent of the present sample of the output voltage; and
$d_1$ is equal to the digital equivalent of the preceding sample of the output voltage.

To assure that the $\phi_1$ and $\phi_2$ clock signals will never be on simultaneously, a 5 percent deadband is provided so that the duty cycle of both the $\phi_1$ and $\phi_2$ signals shall be greater than 5 percent and less than 45 percent.

As shown in FIG. 2, the digital power controller 90 includes a weighting circuit 130 enabling the value of the power output level signals $V_{R1}$ appearing on line 96 (FIG. 1A) to be adjusted to a level capable of being processed by the CMOS circuits of the controller. The output of the circuit 130 is transmitted to an analog/digital converter 132 which converts the analog voltage signals into proportional digital signals. These digital signals are then transmitted to a pulse width calculator circuit 134 for calculating the pulse width of the switching signals $\phi_1$ and $\phi_2$ which signals are then outputted over conductors 38 and 40 from a programmable interval timer 136 to the switching transistors 36 (FIG. 1A). Associated with these circuits is a control logic and sequencing circuit 138 for logically operating the circuits 134 and 136. Also included in the controller 90 is a clock circuit 140 for generating the various clock signals used in the operation of the controller, together with a strobe generator circuit 142 for use in sensing the occurrence of a fault condition within the power system. Further included in the controller 90 is a reference voltage source 144 whose level may be adjusted by the signals MU and MD, together with level detectors 146 for sensing the various power levels occurring in various elements of the controller. A fault diagnostic and strobe latch 148, together with a fault encoder 150, fault diagnostic output latches 152 and a LED display 154 constitute the diagnostic circuit associated with the controller. Reference should be made to the previously cited corresponding application Ser. No. 242,520 of Khamare et al. for a complete disclosure of the diagnostic circuits of the controller.

Figure 3A:
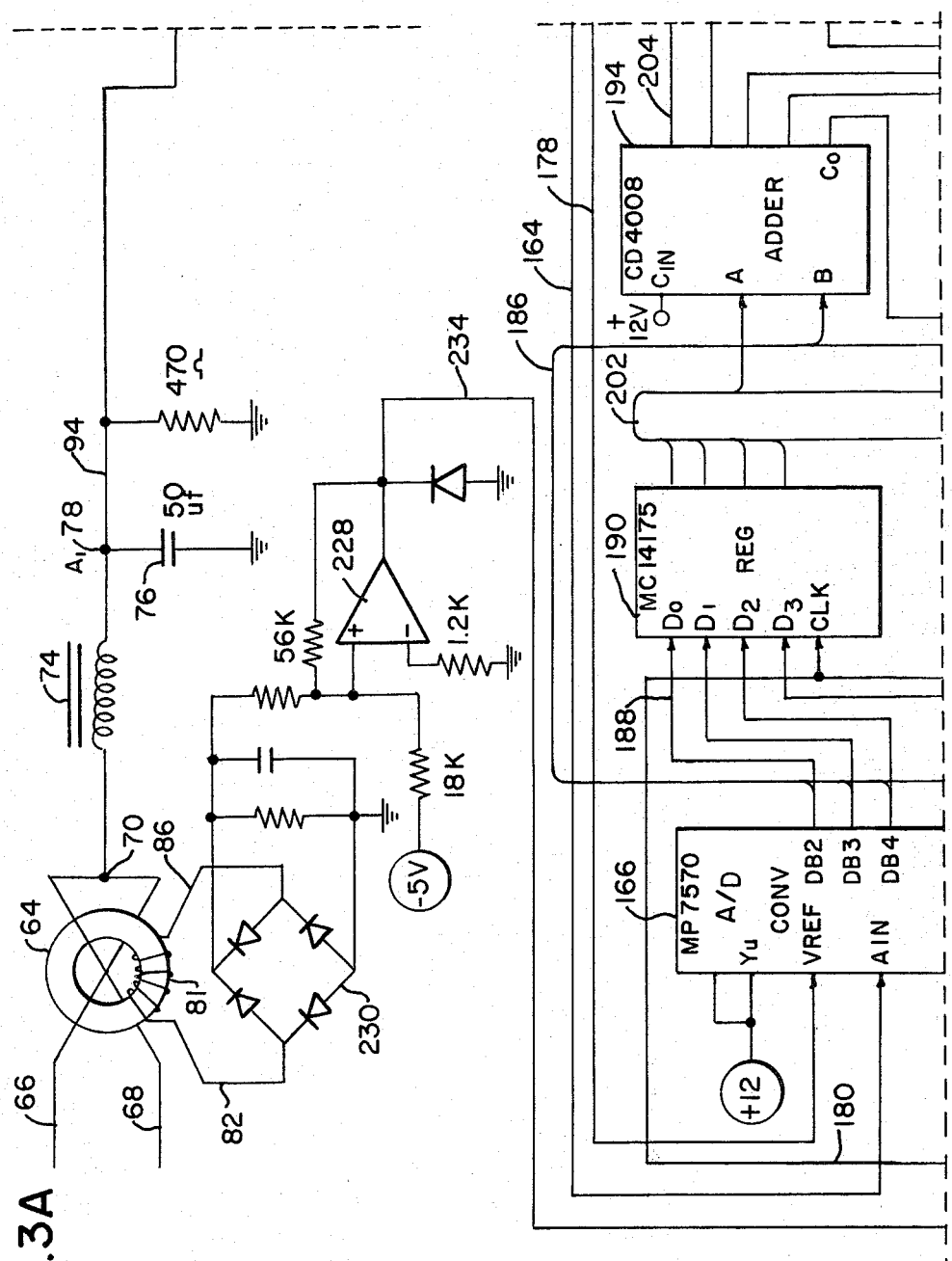
Figure 3B:
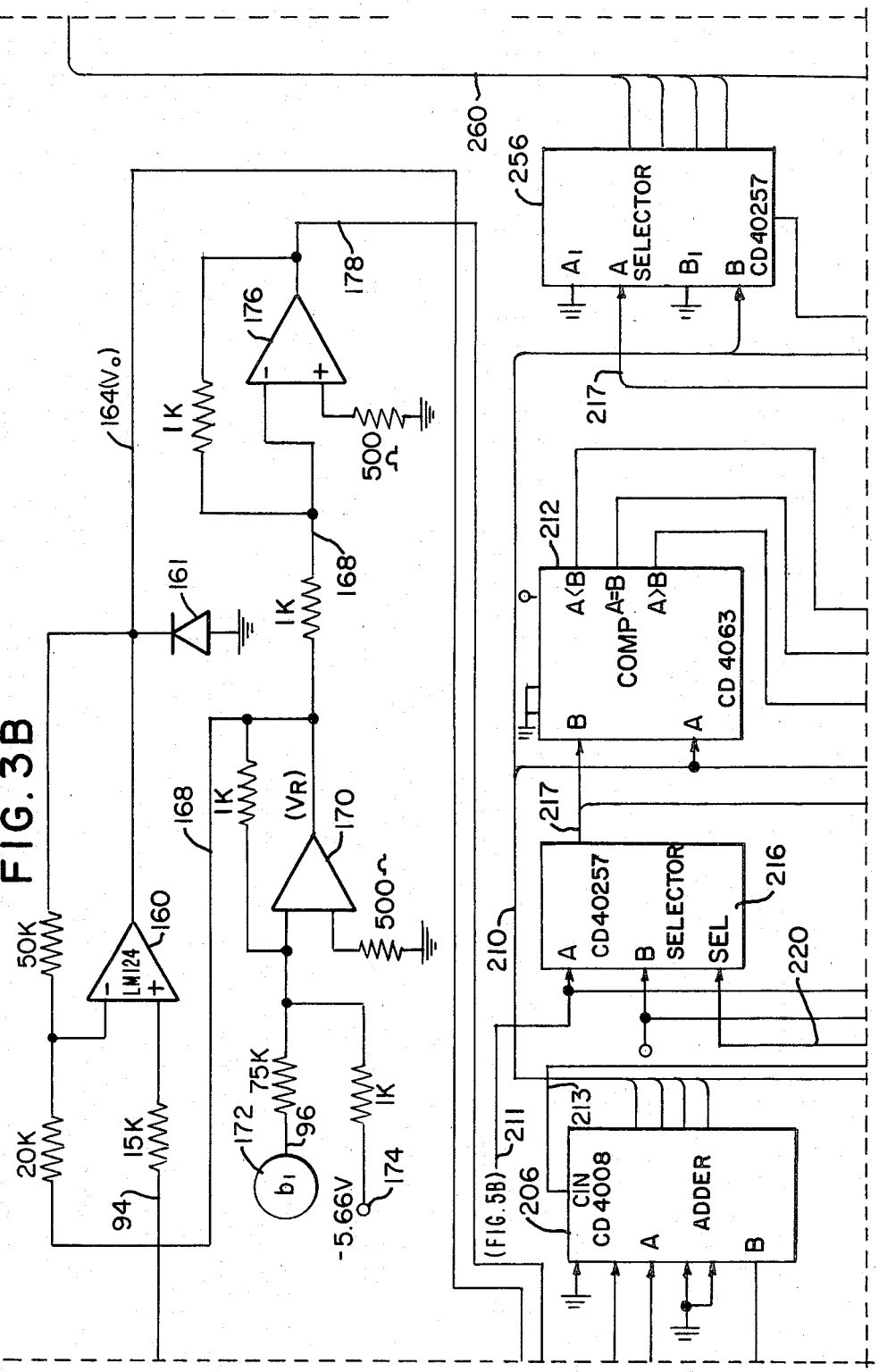
Figure 3C:
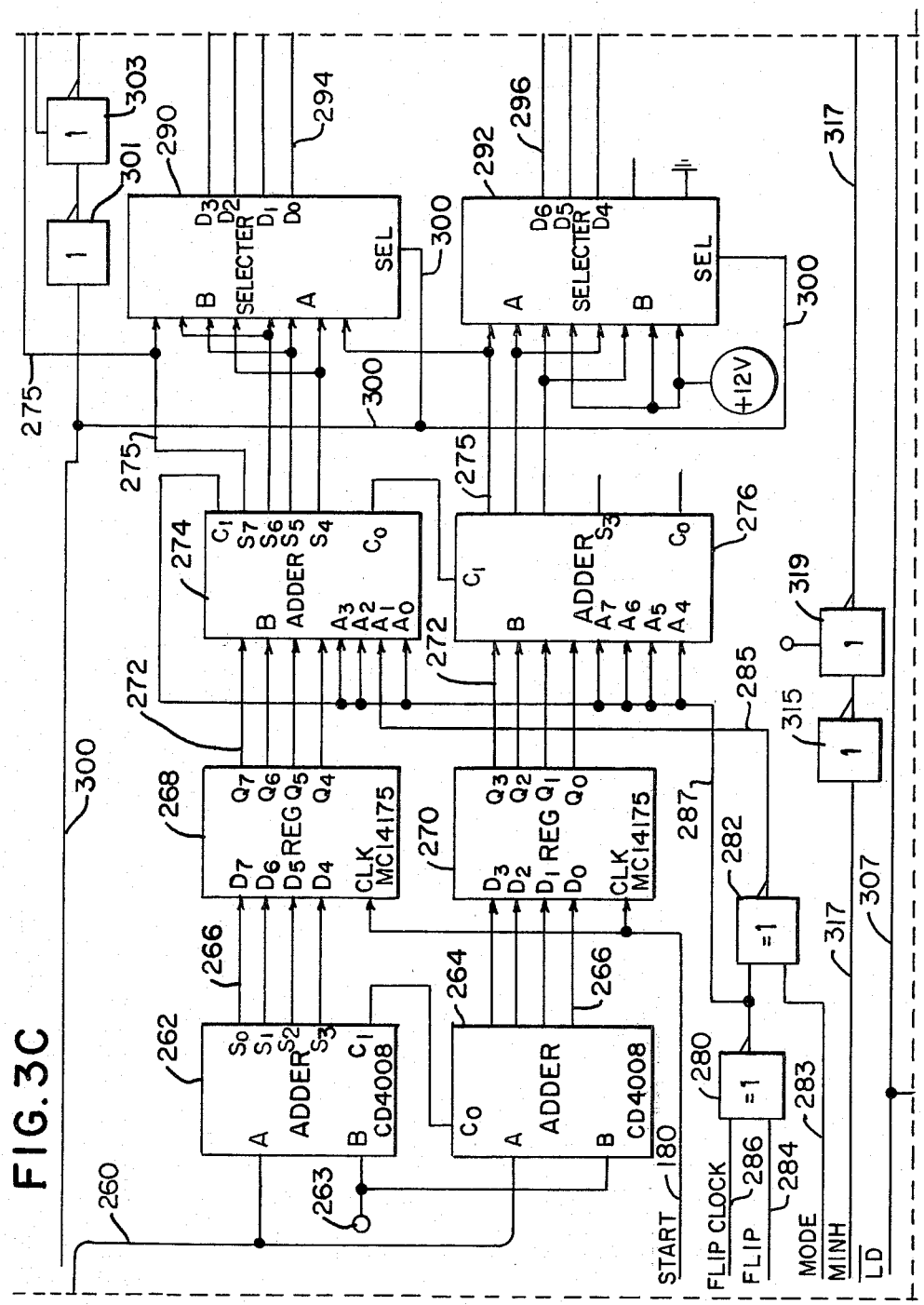
Figure 3E:
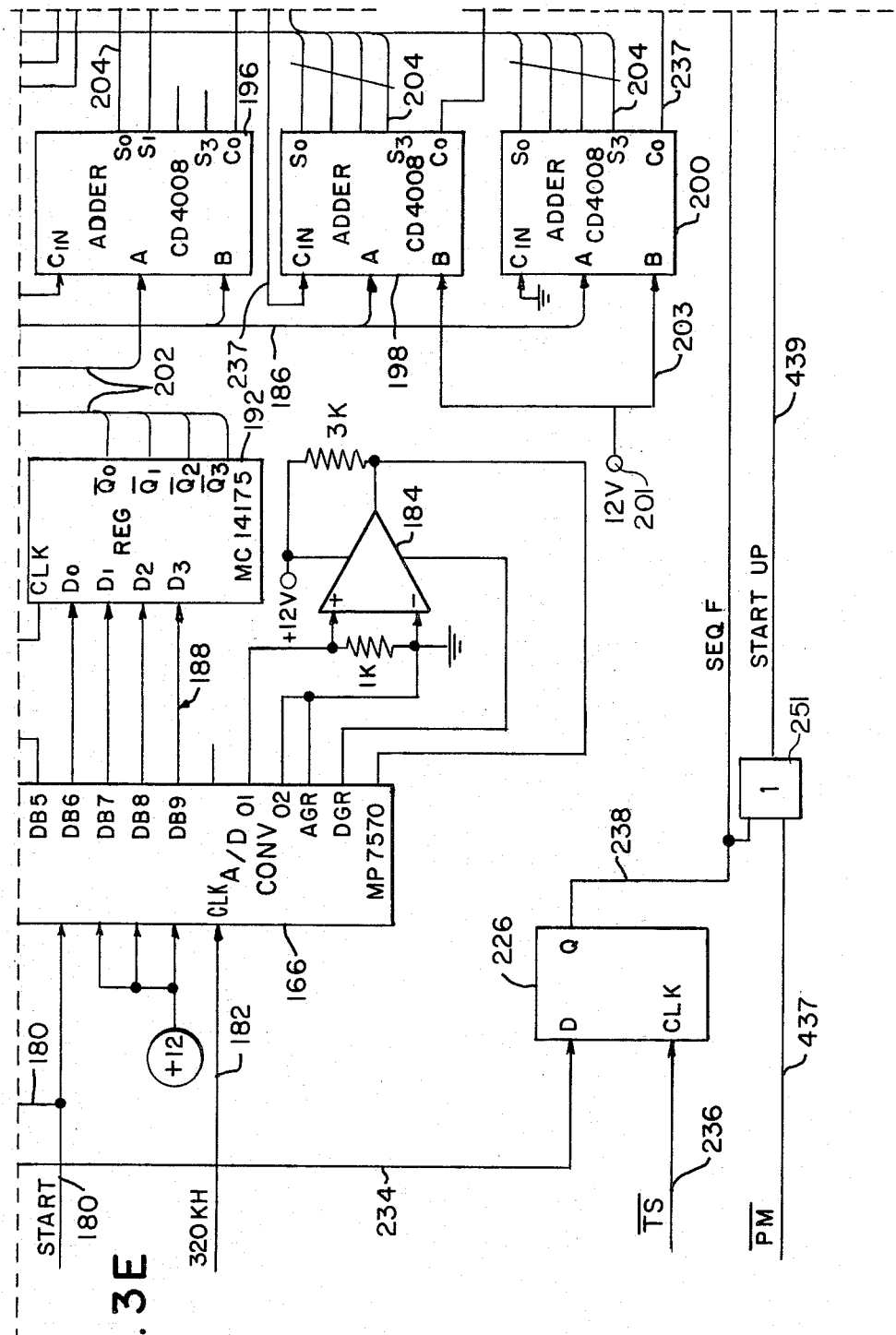

Referring now to FIGS. 3A-3H inclusive, there is shown a logic diagram of the weighting circuit 130, the analog/digital circuit 132, the pulse-width calculator circuit 134, the programmable interval timer circuit 136 and the strobe generator circuit 142 (FIG. 2) of the controller 90. As seen in FIG. 3A, the current sense transformer 64 associated with the 5 volt power output circuit 52 (FIG. 1B) is coupled to the output conductors 66 and 68 of the diodes 60 and 62 (FIG. 1B) through which the current, generated by the transformer 44 (FIG. 1A), flows. Connected between the terminal 72 and the terminal 70 is a choke 74 (FIG. 1B). At terminal 70 will appear the output level $A_1$ of the circuit. This signal $A_1$ representing the voltage level of the power supply during a sampling period is transmitted over conductor 94 to the non-inverting (+) input of a LM124 scaling operational amplifier 160 (FIG. 3B), whose output voltage pulse $V_0$ is transmitted over conductor 164 to the analog input of a MP7570 A/D converter 166 (FIGS. 3A and 3E). The operational amplifier 160 receives over conductor 168 a reference voltage $V_R$ outputted by an LM124 operational amplifier 170.

The reference voltage $V_R$ is a function of the voltage level originally appearing at the terminal 70 (FIG. 1B) and varies with the line voltage 172. This signal $b_1$ appearing on conductor 96 is controlled by a negative 5.66 voltage pulse appearing on the input 174, allowing the reference voltage signal $V_R$ to correspond to the line voltage. The output of the amplifier 170 is directed to the inverted input of an LM124 operational amplifier 176, which inverts the reference voltage $V_R$. This inverted signal is then outputted over conductor 178 to the voltage reference input of the A/D converter 166 (FIGS. 3A and 3E).

The A/D converter 166 receives over conductor 180 the signal START (FIG. 7F) initiating the operation of the A/D converter in addition to the 320 KHz. clock signals (FIG. 7A) over conductor 182. The A/D converter will output over conductor 186 and 188 an 8 bit binary word representing the present sample of the voltage level of the power circuit representing the term d in the regulation equation previously cited. The voltage level output of the power circuit is sampled at a 50 microsecond rate with the resulting 8 bit words outputted over conductors 188 to a pair of MC14175B registers 190 (FIG. 3A) and 192 (FIG. 3E) for storage therein. The four least significant bits of the data word outputted over conductors 188 are inputted into the register 190 while the four most significant bits are stored in the register 192. As the 8 bit word representing the present value d of the power level is being outputted by the A/D converter 166, the value of the previous sampled level is stored in the registers 190 and 192 representing the previous data $d_1$. The present data d also appears on the output lines 186 of the A/D converter 166 and are loaded into the B input of a pair of CD4008B binary adders 194 and 196 (FIGS. 3A and 3E) and into the A input of a pair of CD 4008B binary adders 198 and 200 (FIG. 3E). The adders 194 and 196 will receive at their A input the previous binary data stored in the registers 190 and 192 over conductors 202 enabling the adders 194 and 196 to produce the term $d-d_1$ by performing a two's complement subtraction operation while the adders 198 and 200 will receive at their B input an 8 bit binary word from source 201 and transmitted over conductor 203 (FIG. 3E) which is the two's complement of the value $d_0$ enabling the adders 198 and 200 to produce the term $d-d_0$ by performing a two's complement subtraction operation. In the present example, the binary word appearing on line 203 and generated by the 12 volt power source 201 is the value of 5 V in the two's complement form representing the normal output of the power supply circuit 52 (FIG. 1B).

The binary output of the adders 194–200 inclusive (FIGS. 3A and 3E) are outputted over conductors 204 to a pair of CD4008B adders 206 (FIG. 3B) and 208 (FIG. 3F) which combine both input terms to output in a two's complement form the term $(d-d_0)+4(d-d_1)$. In order to arrive at the term $4(d-d_1)$, the binary bits outputted by the adders 194 and 196 are shifted two places when inputted into the adders 206 and 208. The term $(d-d_0)+4(d-d_1)$ is outputted over conductors 210 to the A input of a pair of CD4063B comparators 212 (FIG. 3B) and 214 (FIG. 3F) which also receives at its B input a binary word from a pair of CD40257B selector circuits 216 (FIG. 3B) and 218 (FIG. 3F).

As previously described, the duty cycle of the switching control signals $\phi_1$ and $\phi_2$ will have a 5 percent deadband to provide that the duty cycle of both signals shall be greater than 5 percent and less than 45 percent. As will be described more fully hereinafter, the controller 90 will initiate a soft start operation of the power supply in which the pulse width of the switching control signals $\phi_1$ and $\phi_2$ are slowly increased until the power output of the circuit reaches 90% of the normal output. As part of this operation, there is sequentially generated on conductor 211 a plurality of binary words each successively representing a larger pulse width for the switching signals $\phi_1$ and $\phi_2$ and which constitute the upper limit of the pulse width. These binary signals are inputted into the A input of the selector circuits 216 and 218. The B input of the selector circuits 216 and 218 will have a binary value representing one-half of the 5 percent lower limit. The selector circuits 216 and 218 are operated by a selecting signal appearing on the input conductor 220. This selecting signal enables the selector circuits 216 and 218 to output over conductors 217 the upper or lower duty cycle limit in accordance with the output level of the power supply. The selecting signal is derived from a signal generated by the Q output of a flip-flop 226 (FIG. 3E) which in turn receives at its D input an output signal generated by an operational amplifier 228 (FIG. 3A) representing the level of the current appearing in the output transformer 44.

As shown in FIG. 3A, the current sense transformer 64 has auxiliary windings 81 for generating a signal representing the level of the current appearing in the power circuit. This signal is transmitted to a bridge rectifier 230 which will output a D.C. voltage pulse to the non-inverting (+) input of a LM124 operational amplifier 228. The output voltage signal of the amplifier 228 representing an overcurrent condition or an undercurrent condition of the circuit is transmitted over conductor 234 to the D input of the flip-flop 226 (FIG. 3E) which, upon the clocking of the flip-flop by the clock signal $\overline{TS}$ appearing on conductor 236 is transmitted over line 238 to a gate circuit which includes an AND gate 240 and an OR gate 242. The OR gate 242 in addition to the signal appearing on conductor 233 from the AND gate 240 receives the output signal over conductor 235 from a gate circuit which includes the AND gates 239, 241, 243 and 245 and the OR gate 247. The gate circuit receives the control signal $\overline{PM}$ appearing on conductor 437 (FIGS. 3E and 8) which is low during the operation of the power supply. The signal $\overline{PM}$ is transmitted through an OR gate 251 (FIG. 3E), over conductor 439 to the AND gate 240 (FIG. 3F), the inverter 249 to the AND gate 245. This gate circuit generates a signal in response to the level of the carry out signals generated by the adders 194–208 inclusive thereby enabling the signal outputted by the AND gate 242 to select a value representing the pulse-width word which is within the limits of 2.5 and 22.5 percent of the duty cycle. If the output signal appearing on the conductor 220 is high indicating the existence of an overcurrent condition, the selectors 216 and 218 will be operated to output the binary word representing the lower limit appearing at the B input which is equivalent to $2\frac{1}{2}$ percent of the duty cycle.

In a similar manner, if the voltage level of the power supply is at a level which represents an undercurrent condition, the selector circuits 216 and 218 will be operated by a low signal on conductor 220 to output a binary word representing an upper limit for controlling the switch control signals $\phi_1$ and $\phi_2$. As will be explained more fully hereinafter, this binary word has a pulse width greater than 5 percent duty cycle but equal to or less than 45 percent duty cycle depending on the binary word transmitted over conductor 211 and appearing at the A input of the selector circuits 216 and 218 at this time. These signals appearing on output conductors 217 of the selectors 216 and 218, together with the current term appearing on the output conductors 210 of the adders 206 (FIG. 3B) and 208 (FIG. 3F) are inputted into the CD 4063 comparators 212 (FIG. 3B) and 214 (FIG. 3F), which compares the present term with the selected limit and outputs the appropriate signals over the output conductors 244 and 246 to a logic gate circuit comprising the AND gates 248-252 inclusive and the OR gate 254. The output of the AND gate 252 is connected to the select inputs of a pair of CD40257B selector circuits 256 (FIG. 3B) and 258 (FIG. 3D).

The selector circuits 256 and 258 enabled by the control signal appearing on the output conductor 259 of the AND gate 252, select the binary word appearing on conductors 217 representing the selected limit or in the case where the calculated data appearing on conductor 210 is between the upper and lower limits, the calculated data itself. As may be seen from FIG. 3B, the $A_1$ bit input and the $B_1$ bit input of the selector circuit 256 are tied to ground resulting in the binary bits appearing on the input conductors 210 and 217 being shifted one bit position when loaded into the selectors 256 and 258, thereby enabling the output signals of the selectors 256 and 258 to represent the term $2[(d-d_0)+4(d-d_1)]$. This term represents the pulse-width correction term $T_3$ in the previously cited total pulse-width equation and will appear on the output conductors 260 of the selector circuts 256 and 258 for transmission to the A input of a pair of CD4008B adder circuits 262 and 264 (FIG. 3C). Appearing at the B input of the adders circuits 262 and 264 is a binary value in the one's complement form representing the nominal pulse-width for a 5 volt power supply corresponding to the term $T_0$ in the previously cited pulse-width equation. The adder circuits 262 and 264 will output over conductors 266 the binary word TPW representing the total pulse width of the switching control signals $\varnothing_1$ and $\varnothing_2$ to a pair of of registers 268 and 270 (FIG. 3C) for storage therein under the control of the clocking signal START (FIG. 7F) appearing on conductor 180. The registers 268 and 270 will output the binary word representing the total pulse-width word TPW over conductor 272 to a pair of CD4008B adders 274 and 276 (FIG. 3C) whose output value will be implemented in accordance with a balancing operation which will now be described.

As is well-known in the art, a long-term imbalance in the transformer 44 (FIG. 1A) results in a buildup of the magnetizing current due to the unequal volt second drive from the power switches 36 (FIG. 1A). In order to eliminate this buildup of the magnetizing current, the controller 90 provides positive and negative threshold detectors such that the output pulse-width signal appearing on the conductor 272 of the registers 268 and 270 is increased/decreased upon the detection of each threshold of opposite sign. The effect of the balance correction on the pulse modulating signal is shown in FIG. 11E. A change of 8 percent in the duty cycle is selected which represents a volt second imbalance greater than normally expected in the driver electronics. This is done so that the slope of change in the magnetizing current ($I_M$) is an independent of the drive electronics as possible. An $I_M$ negative and positive threshold which is 30 percent of the maximum magnetizing current level is selected which is well below the necessary level of saturation. When the forced buildup of the magnetizing current reaches the positive threshold, a voltage comparator is toggled and the controller 90 subtracts (FIG. 12B) a count representing 4 percent of the duty cycle from the phase of the clock which made it toggle and adds 4% of the duty cycle (FIG. 12A) to the other pulse of the clock making a total change of 8% in the duty cycle of the switching control signals $\varnothing_1$ and $\varnothing_2$. This action forces the $I_M$ curve to walk down as illustrated in FIG. 11E until the opposite threshold is reached where the process is reversed causing the $I_M$ curve to walk up as shown in FIG. 11E. It will be seen that this arrangement prevents the $I_M$ curve from ever reaching the saturation level of the transformer 44.

The signals for controlling this balancing operation are generated by a pair of EXCLUSIVE OR gates 280 and 282 (FIG. 3C) which receive the control signal FLIP (FIG. 8) on conductor 284 and the clock signal FLIPCLOCK (FIGS. 5B and 12C) on conductor 286 which originate in the signal conditioning circuit 104 (FIG. 1A). The operation of the gates 280 and 282 will either add or subtract a binary word with respect to the binary word appearing at the A inputs of the adders 274 and 276. With the signal MODE being always low, the adders 274 and 276 will add the B input to the A input when the input signals to the gate 280 are the same and subtract when the signals are different. As a result of this operation, the adders 274 and 276 will output a pulse width which has a $\Delta$ DC (FIGS. 12A and 12B) added to one of the $\varnothing_1$ and $\varnothing_2$ control signals and subtracted from the other control signal which affects the $I_M$ curve (FIG. 11E) in the manner described previously.

The output binary word representing the total pulse-width from the adders 274 and 276 are transmitted over conductors 275 to a pair of CD4069 selector circuits 290 and 292 (FIG. 3C) which will output over conductors 294 and 296 respectively a binary word representing the pulse-width value when operating at a switching frequency of either 20 KHz. or 40 KHz. The selectors 290 and 292 are operated by a manually selected signal FRESEQ appearing on conductor 300 which will be low when 20 KHz. is selected as the switching frequency or high when the 40 KHz. is selected. The output binary bits of the selectors 290 and 292 are transmitted through a series of special inverters 302 providing a CMOS to TTL compatible level shift and inversion of the binary bits from the one's complement form to obtain the true data for use with the TTL construction of a pair of 74LS191 binary counters 304 and 306 (FIG. 3D). The counters are preset by the binary signals received over conductors 294 and 296 to initiate a counting sequence in which the counters 304 and 306 will count down to zero. Upon reaching zero, the counters 304 and 306 will output control signals over conductors 301, 303 and 305 and through the gates 308-318 inclusive to the clear input of a pair of 74LS74 flip-flops 320 and 322 (FIG. 3H), thereby clearing the flip-flops.

At the time the clock signal FLIPCLOCK (FIGS. 5B and 12C) went high enabling the adders 274 and 276 (FIG. 3C) to add the $\Delta$ DC binary word to the total pulse word, the flip-flop 320 is clocked by the clock signal $\overline{ST}$ (FIG. 7I) appearing on conductor 321. The clearing of the flip-flop 320 in the manner described above determines the pulse width of the $\varnothing_1$ switching control signal appearing on the Q output conductor 38. The clock signal FLIPCLOCK identifies the switching operation corresponding to the $\varnothing_1$ and $\varnothing_2$ control signals. As best seen from FIG. 12C, the clock signal FLIPCLOCK has a 50 us. time period and a 50% duty cycle. During the 25 us. high portion of the signal FLIPCLOCK, the signal $\phi_1$ is active while during the next 25 us. when the signal FLIPCLOCK is low, the signal $\phi_2$ is active. Whether to add or subtract the Δ DC binary word to the clock signals $\phi_1$ to $\phi_2$ is controlled by the signal FLIP. When the signal FLIPCLOCK appearing on conductor 286 (FIG. 3C) is high and the signal FLIP appearing on conductor 284 is high, the gate 280 will output a low signal and the gate 282 a low signal. These signals enable the adders 274 and 276 (FIG. 3C) to add the Δ DC binary word to the total pulse width of the control signal $\phi_1$. If the signal FLIPCLOCK is low while the signal FLIP is high, the gates 280 and 282 enable the adders 274 and 276 to subtract the Δ DC binary word from the total pulse width of the control signal $\phi_2$. By changing the pulse width of the control signals $\phi_1$ and $\phi_2$ in this manner, the curve of the magnetizing current $I_M$ is forced to walk up as shown in FIG. 11E until the upper threshold is reached at which time the balance comparator 283 (FIG. 5B) will output the low signal FLIP over conductor 284 to the EXCLUSIVE OR gate 280 (FIG. 3C). This condition will reverse the operation described above forcing the $I_M$ curve of the magnetizing current to walk down (FIG. 11E) until the lower threshold is reached enabling the circuit to again reverse the operation in the manner described above. This arrangement prevents the magnetizing current from reaching the saturation level of the transformer 44.

Figure 3G:
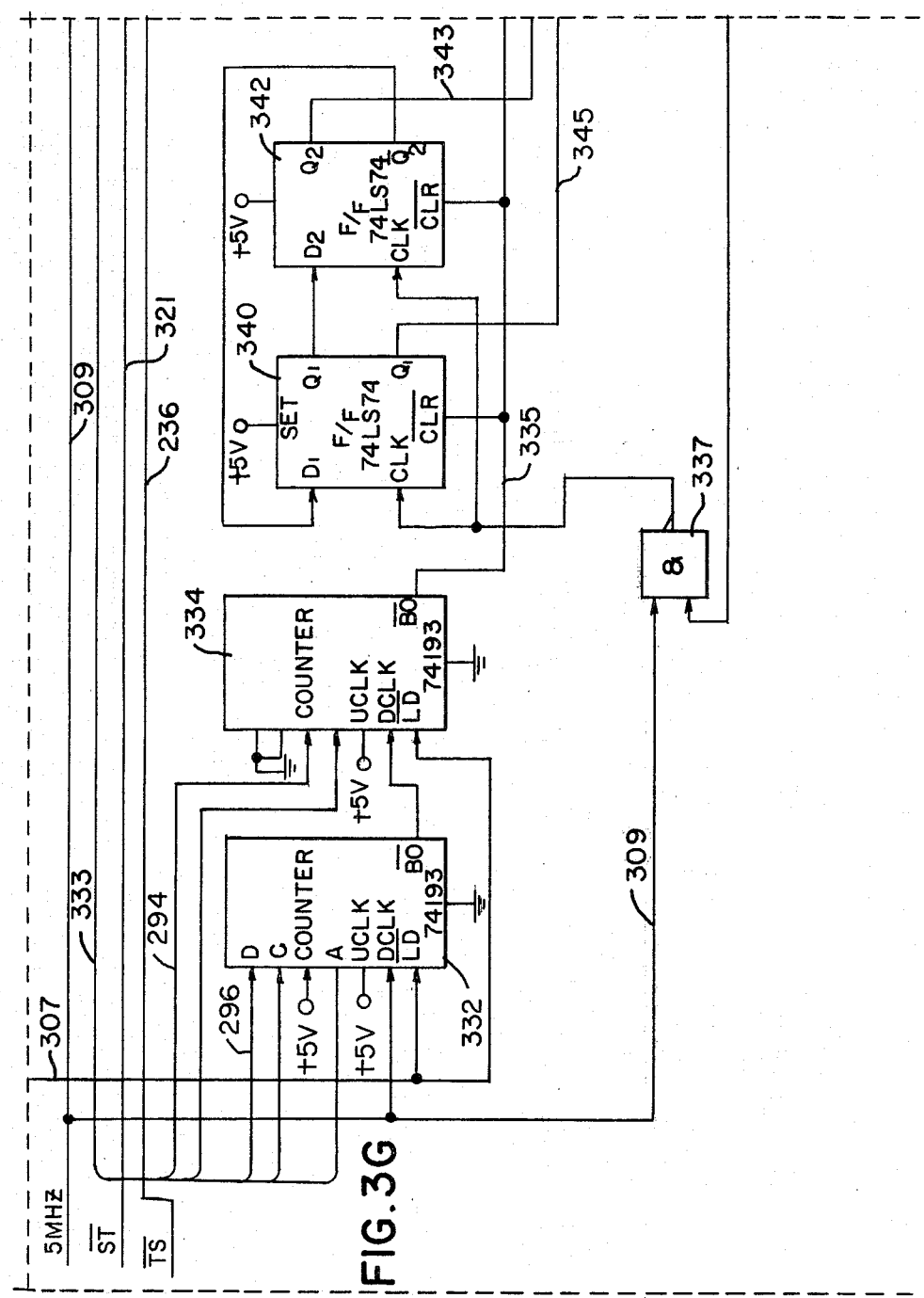
Figure 3H:
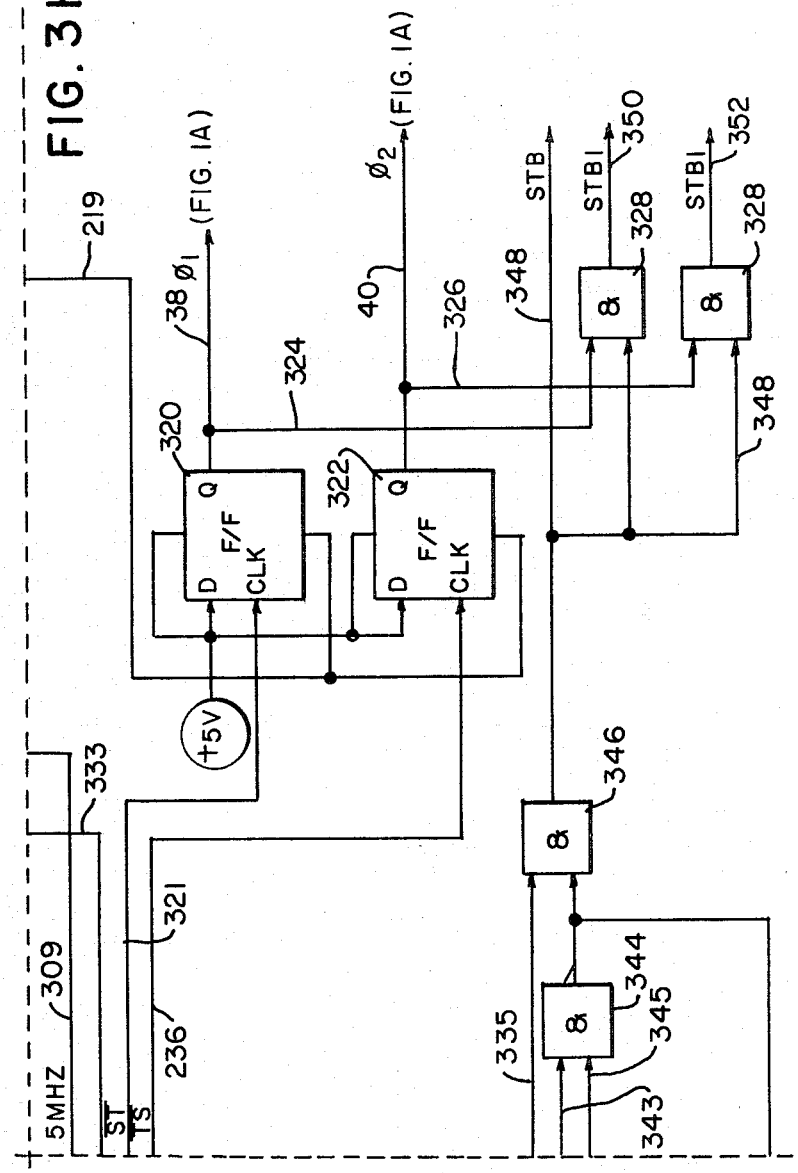

The switching control signals $\phi_1$ and $\phi_2$ are also transmitted over conductors 324 and 326 (FIG. 3H) to one input of a pair of AND gates 328 and 330 (FIG. 3H) which also receive input signals from a strobe generating circuit comprising the 74193 binary counters 332 and 334 (FIG. 3G). The counters 332 and 334 are preset by the pulse-width data appearing on the output conductor 294 and 296 from the selectors 290 and 292 (FIG. 3C) and which are transmitted over the cable 333 (FIG. 3D). The binary data is shifted one position to the right when loaded into the counters 332 and 334 which divides the inputted data by two. The counters 332 and 334 are operated to output a control signal over conductor 335 when the counters reach a count which is one half the count of the counters 304 and 306 (FIG. 3D), thereby enabling the AND gates 328 and 330 to generate a strobe pulse which goes high in the middle of the $\phi_1$ and $\phi_2$ clocking pulses. The operation of the AND gates 328 and 330 are controlled by the operation of a pair of flip-flops 340 and 342 (FIG. 3H). The flip-flops 340 and 342 are clocked by the 5 MHz. clock signals appearing on conductor 309 and are transmitted through a NAND gate 337 enabled when the flip-flops are cleared. The flip-flops 340 and 342 are cleared by the appearance of the control signal on the conductor 335 from the counter 334 with the outputs of the flip-flops 340 and 342 being gated over conductors 343 and 345 through a NAND gate 344 (FIG. 3H) and the AND gate 346. The gate 346 outputs a strobe pulse STB over conductor 348 in addition to the strobe pulses STB1 and STB2 appearing on the output conductor 350 and 352 respectively of the AND gates 328 and 330 during the time the $\phi_1$ and $\phi_2$ signals are active. The strobe signals appearing on conductors 348, 350 and 352 are used in the diagnostic circuit of the power supply. For a complete disclosure of the diagnostic operation of the power supply, reference should be made to the previously-cited Khamare et al. application, Ser. No. 242,788.

Figure 5A:
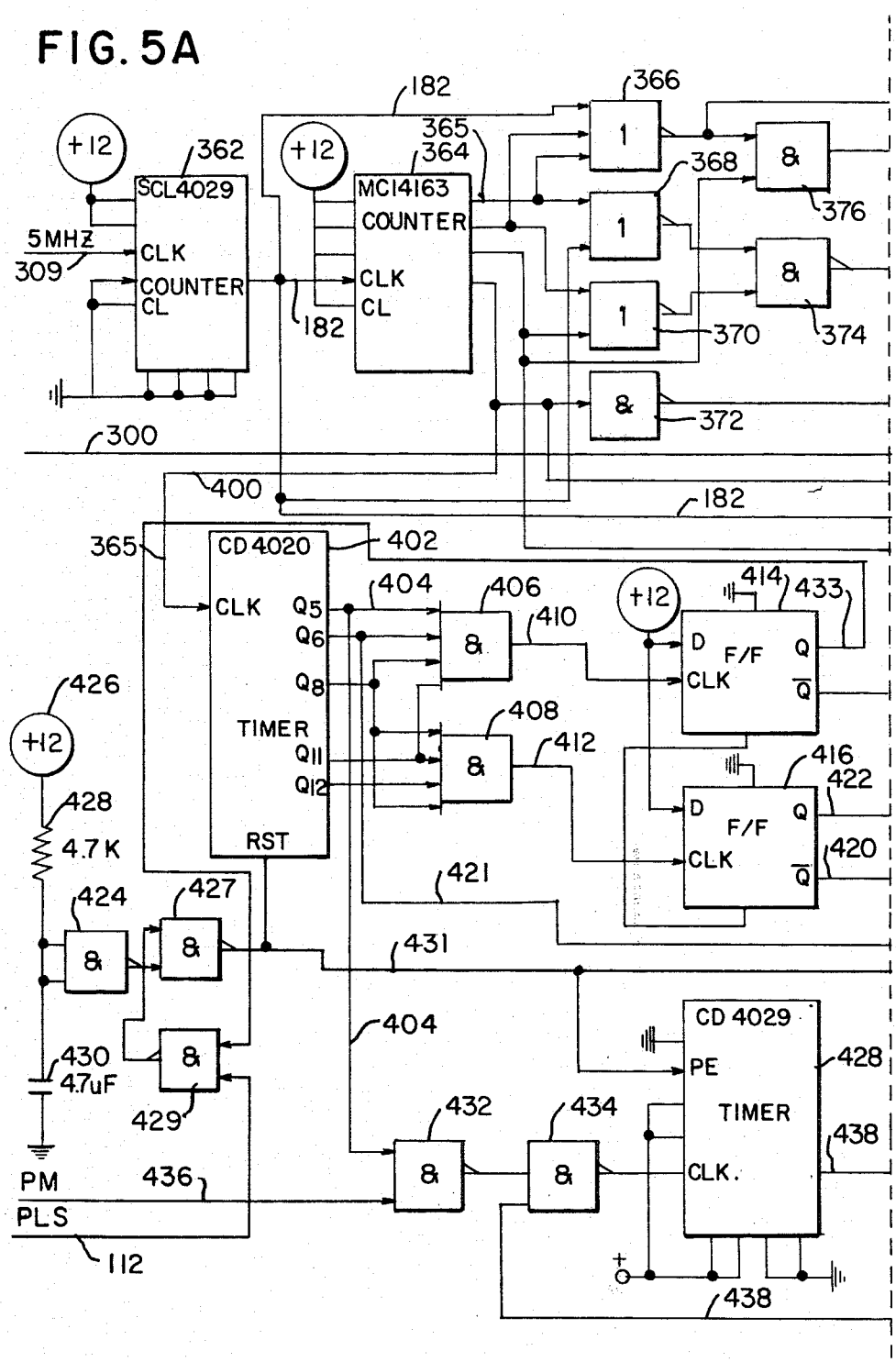
Figure 7:
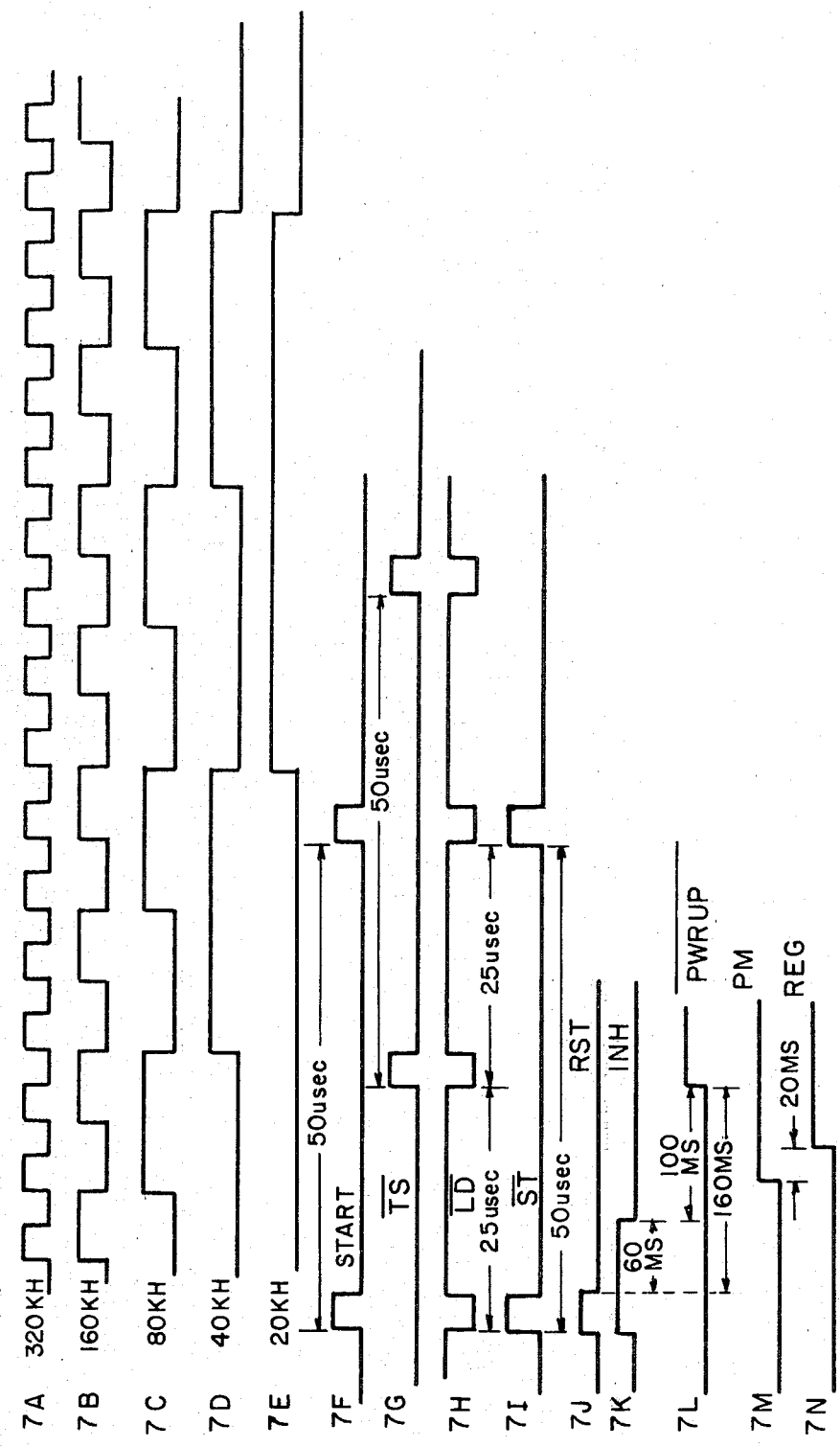
FIGS. 7A-7N inclusive show various wave shapes associated with the preferred embodiment.

Referring now to FIGS. 5A and 5B, there is shown the timing circuit for generating the various control signals used in the operation of the power supply. As shown in FIG. 5A, a 5 MHz. clock signal generated from a 5 MHz. oscillator (not shown) is transmitted over conductor 309 into the clock input of a SCL4029 4-bit divide-by-sixteen counter 362 which divides the input clock signal by 16 to output over conductor 182 the 320 KHz. clock signals (FIG. 7A). The conductor 182 is coupled to the clock input of a second MC14163 4 bit divide-by-sixteen counter 364 which will output over its output conductors 365 the 20 KHz. clock signals (FIG. 7E) to a gate circuit which includes the NOR gates 366–370 inclusive, the NAND gates 372 and 374, the AND gate 376, together with the NOR gates 378–382 inclusive (FIG. 5B) and the NAND gates 384 and 386 which circuit outputs over conductor 387 the 4 bit clock signals into a CD40257 selector 390. The selector 390 is operated by the signal FREQSEL which appears on conductor 300 and which is manually generated by the operator to select either a 20 KHz. or 40 KHz. switching frequency. The signal FREQSEL will be high if a 40 KHz. frequency is selected or low if a 20 KHz. signal is selected. The signal FREQSEL will operate the selector 390 to output over lines 391 the selected clock pulses to a plurality of level shift gates 394 which shift the level of the CMOS input signals to a voltage level enabling the TTL circuits to operate.

Appearing on the output conductor 321 of the gates 394 is the control signal $\overline{ST}$ (FIG. 7I) which is used to clock the flip-flop 320 (FIG. 3H) to output the switching control signal $\phi_1$ (FIG. 12A). Appearing on the output conductor 236 is the clocking signal $\overline{TS}$ (FIG. 7G) used to clock the flip-flop 322 (FIG. 3H) for outputting the second switching control signal $\phi_2$ (FIG. 12B). As may be seen from an examination of FIGS. 7G and 7I, and FIGS. 12A and 12B, the switching control signals $\phi_1$ and $\phi_2$ are generated 180° out of phase with each other. Appearing on the output conductor 286 of the selector 390 is the signal FLIPCLOCK (FIG. 12C) which is inputted into the EXCLUSIVE OR gate 280 (FIG. 3C) for controlling the addition and the subtraction of the counts representing the Δ DC to the pulse width word during a balancing operation. Appearing on the output conductor 307 is the signal $\overline{LD}$ (FIG. 7H) which loads data into the counters 304 and 306 (FIG. 3B) enabling the switching control signals $\phi_1$ and $\phi_2$ to be outputted by the flip-flops 320 and 322 (FIG. 3H).

The 20 KHz. signal (FIG. 7E) appearing on one of the output conductors 365 of the counter 364 (FIG. 5A) will clock a CD4020 timer 402 (FIG. 5A) which will output clocking signals over its output conductors 404 to a pair of AND gates 406 and 408 whose output signals will be transmitted over conductor 410 and 412 to a pair of CD 4013 D-type flip-flops 414 and 416. Appearing on the $\overline{Q}$ output conductor 418 of the flip-flop 414 will be the inhibit signal INH which, as shown in FIG. 7K will go high at the time the controller is reset by the reset signal RST (FIG. 7J) and will go low 60 ms. after the signal RST goes low. As will be described more fully hereinafter, this 60 ms. delay allows the controller to condition the switching of the transistors to occur after the controller has been reset. Appearing on the Q and $\overline{Q}$ outputs of the flip-flop 416 will be the power up signals PWRUP appearing on conductor 420 and the inverted power up signal $\overline{PWRUP}$ appearing on conductor 422. After 100 ms. has elapsed, the output count of the timer 402 which appears on the input of the AND gate 408 enables the gate to output a clocking pulse to the flip-flop 416 resulting in the signal $\overline{\text{PWRUP}}$ going high. The signals $\overline{\text{PWRUP}}$ going high will notify the controller 90 (FIG. 1A) that the power supply has failed to reach 90% of its normal output within the 100 ms. time period. In response to this signal, the controller will shut down the power up operation.

Also included in the timing circuit of FIGS. 5A and 5B is a reset circuit which includes a NAND gate 424 powered by a 12 volt power supply 426 tied to ground through a 4.7K resistor 428 and a 4.7 uF capacitor 430. Further included in the reset circuit is the NAND gate 427 which receives the output signal from gate 424 and the output signal from a second NAND gate 429. THe NAND gate 429 receives the power loss sense signal PLS appearing on conductor 112 (FIG. 1A) and the Q output of the flip-flop 414 over conductor 433. The signal PLS (FIG. 8) will go high when the bulk voltage appearing on the output of the bridge rectifier 24 (FIG. 1A) reaches 78% of a reference voltage enabling the NAND gates 427 and 429 to output over conductor 431 the reset signal RST to reset various circuits in the controller. Also included in the timing circuit is a CD4029 timer 428 (FIG. 5A) which is clocked by a clock signal appearing on the output line 404 from the timer 402 and which is transmitted through the NAND gates 432 and 434. The timer 428 will output the control signal REG (FIG. 7N) which initiates a power-up sequence and which occurs 20 ms. after the control signal PM (FIGS. 7M and 8) appearing on the input conductor 436 to the NAND gate 432 goes high. The control signal PM goes high when the power supply has reached 90% of its normal value within 100 ms. of the time the power supply started its switching operation. Otherwise it indicates an unsuccessful attempt to provide a power-up operation. Once the signal PM goes high, it initiates a soft start operation for another 20 ms. after which the timer 428 will output a low signal over conductor 438 which is inverted by the NAND gate 440 (FIG. 5B) to provide the signal REG on conductor 442.

Further included in the timing circuit is a CD4029 binary counter 425 (FIG. 5B) which is clocked by a signal appearing on the conductor 421 and transmitted from the output line 404 of the timer 402 (FIG. 5A). The counter 425 will generate over the output conductors 211 a plurality of consecutively higher binary numbers, each comprising a value representing a percentage of the duty cycle of the power supply and which is used, when inputted into the selectors 216 (FIG. 3B) and 218 (FIG. 3F), as the upper limit of the pulse width of the switching control signals $\emptyset_1$ and $\emptyset_2$ during a soft start operation as will be described more fully hereinafter.

Figure 8:
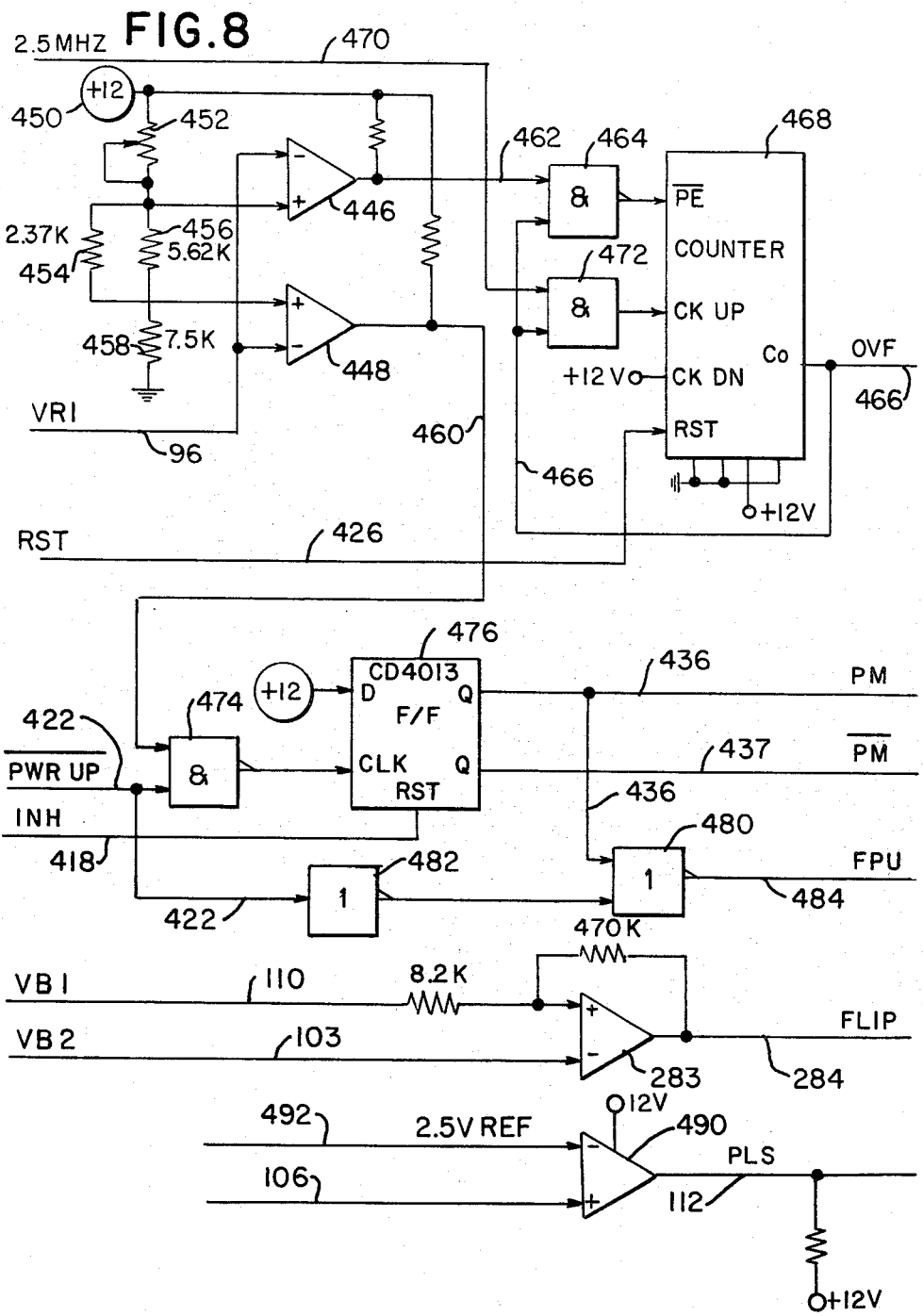
FIG. 8 discloses the logic circuit for detecting the occurrence of an overvoltage and overcurrent condition of the power supply.

Referring now to FIG. 8 of the drawings, there is shown the logic circuits for detecting the occurrence of an overvoltage and overcurrent condition of the power supply together with the circuits for generating the control signals FLIP and PLS. Included in the circuit are a pair of LM139 operational amplifiers 446 and 448 which compare the voltage output of the power supply represented by the signal $V_{R1}$ appearing on the output conductor 96 (FIG. 1A) of the signal conditioner 88 with a reference voltage. This binary signal $V_{R1}$ is inputted into the inverting (−) input of the amplifier 446 and 448 which receives at their non-inverting inputs (+) a reference voltage level representing the threshold voltage level which determines an overvoltage or undervoltage condition. A 12 volt power supply 450 supplies voltage to a 2K pot resister 452 which in turn supplies a reference voltage to the amplifier 446 the level of which is 112%–125% of the normal value of the power output circuit 52 which in the present example is 5 V. A voltage drop network comprising resistor 454–458 inclusive provides a reference voltage to the amplifier 448 which will output a high signal over conductor 460 when an undervoltage condition exists. If an overvoltage condition exists, the amplifier 446 will output over conductor 462 a low signal to one input of a NAND gate 464 whose other input receives a high signal appearing on the output conductor 466 of an overvoltage fault flag generator comprising a CD40192 counter 468. The NAND gate 464 when receiving the low signal over conductor 462 will output a high signal to the timer 468 which outputs the overvoltage signal OVF over conductor 466 after a 2 us. delay. The signal OVF will remain high until the counter is reset by the signal RST appearing on the conductor 426. The counter 468 is clocked by 2.5 MHz. clock signals appearing on conductor 470 and which are transmitted through the AND gate 472 enabled by the high signal appearing on the conductor 466. The high signal appearing on the output conductor of the amplifier 446 is also outputted into one input of a NAND gate 474 which receives over conductor 422 the low signal $\overline{\text{PWRUP}}$ (FIG. 5B) enabling the NAND gate 474 to clock a CD4013 D-type flip-flop 476 which outputs over the Q output conductor 436 the signal PM (FIG. 7L). As previously described, the signal PM enables the timer 428 (FIG. 5A) to output the signal REG (FIG. 7M) after a 20 ms. delay.

The signal PM appearing on the output conductor 436 is also inputted into a NOR gate 480 which receives the inverted PWRUP signal transmitted over conductor 422 to the inverter 482 and which is high when the level of the power supply has not reached 90% of its rated output within 100 ms. after the start of a power up sequence. The NOR gate 480 will output the high signal FPU over conductor 484 indicating the condition that the power output of the circuit 52 (FIG. 1) has not reached its rated output. In response to the generation of this signal, the controller 90 will shut down the system.

Also disclosed in FIG. 8 is the circuit for the generation of the signal FLIP used in the balancing circuit shown in FIG. 3C and the signal PLS used in resetting the controller after the bulk voltage level has reached 78% of the normal output of the power supply. Included in the circuit is an LM139 operational amplifier 283 which receives over its input conductors 108 and 110 (FIG. 1A) the balancing signals VB1 (FIG. 11C) and VB2 (FIG. 11D). Upon the $I_M$ curve a FIG. 11 reaching the positive region of the saturation current, the signal FLIP will go high. When the curve reaches the negative region of the saturation current, the signal FLIP will go low. Also included in the circuit is an operational amplifier 490 which receives over conductor 492 a 2.5 V reference voltage and the level of the bulk voltage at the output of the bridge rectifier 24 (FIG. 1A). This signal appears on conductor 106 (FIG. 1A). The amplifier 490 will output the high signal PLS over conductor 112 when the bulk voltage reaches 78% of the normal output. As described previously, this signal enables the gates 427 and 429 (FIG. 5A) to reset the controller 90 wherein the controller will initiate a power up sequence.

Figure 9A:
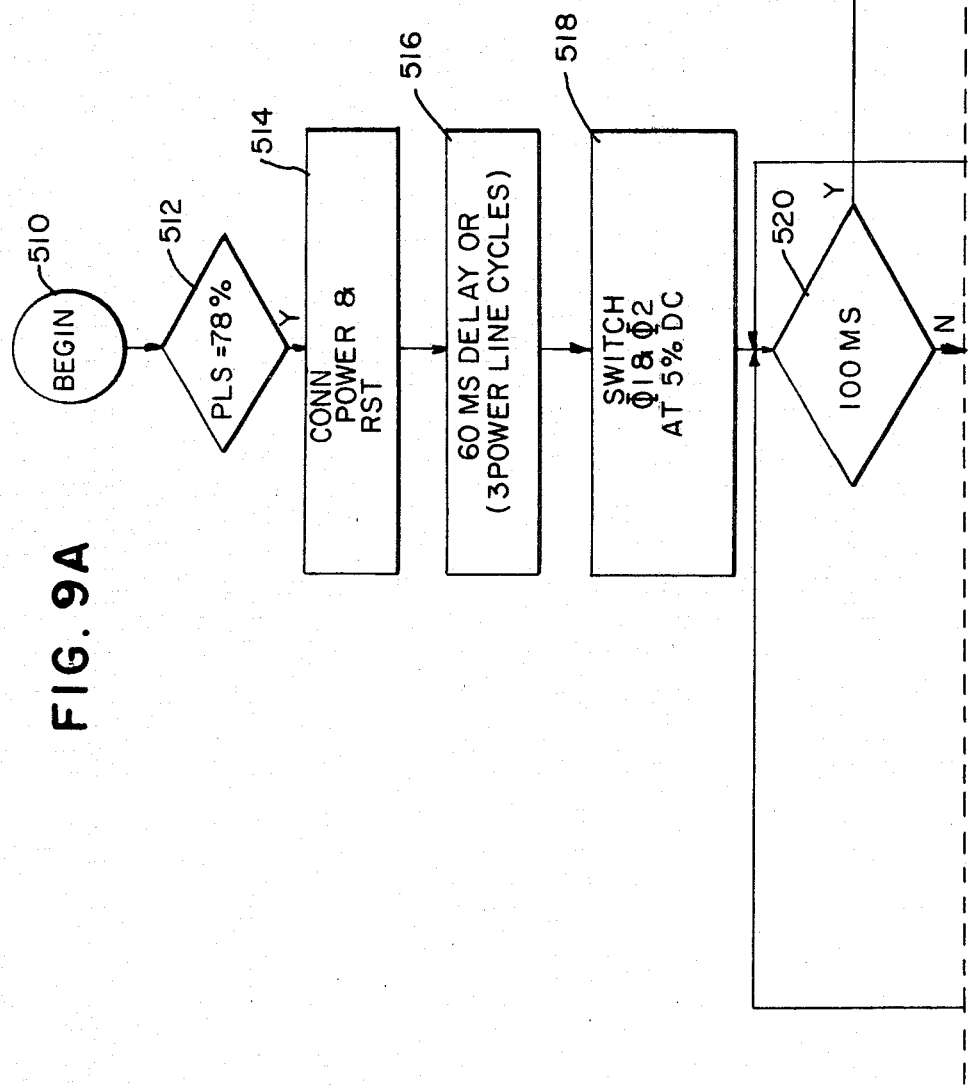
Figure 9B:
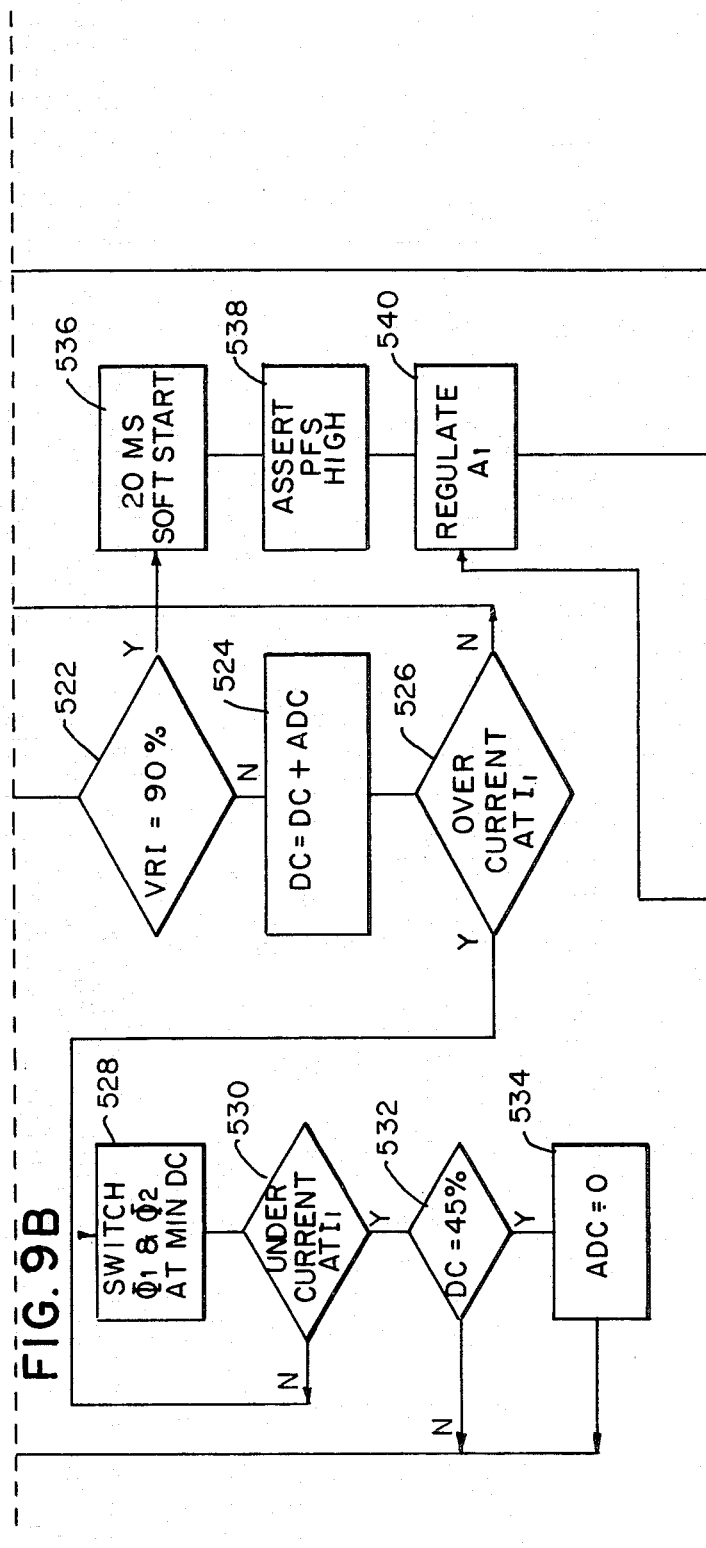

Referring now to FIGS. 9A and 9B inclusive, there is shown a flowchart of the operation of the controller. Upon initiating the operation of the power supply (block 510), the voltage level appearing at the terminal 26 (FIG. 1) which is developed across the capacitor 30 will start to increase. Upon reaching 78% of its normal output (block 512), the signal PLS will go high and the voltage $V_{DD}$ appearing on line 115 (FIG. 1A) will be supplied to the controller 90 (block 514). During this time, the reset signal RST (FIG. 7J) and the inhibit signal INH (FIG. 7K) will go high resetting various logical elements including the circuits for controlling the generation of the switching control signals $\emptyset_1$ and $\emptyset_2$. After the active signal RST has been applied, the flip-flop 414 (FIG. 5A) controlled by the timer 402 will lower the inhibit signal INH (FIG. 7K) which as previously described occurs 60 ms. after the reset signal RST has gone low (block 516). Upon the inhibit signal INH going low, the controller will initiate a soft start operation by outputting the switch control signals $\emptyset_1$ and $\emptyset_2$ having a pulse width equal to five percent duty cycle (block 518). The switch control signals $\emptyset_1$ and $\emptyset_2$ will appear on the conductors 38 and 40 (FIG. 1) to operate the switching transistors 36 (FIG. 1) enabling current to flow through the transformer 44. As previously described, the transistors will be operated at a duty cycle which includes a balancing factor. The pulse width of the signal $\emptyset_1$ is equal to 45 percent of the switching frequency which includes a $\Delta DC$ balance factor of 4% duty cycle, while the pulse width of the $\emptyset_2$ switching signal is equal to 37% of the switching frequency which includes a negative $\Delta DC$ balance factor of 4% duty cycle. As the voltage output level of the power supply increases, the controller will check to see if the voltage level $V_{R1}$ has reached a 90 percent level of the rated voltage level of 5 volts (block 522) within 100 ms. (block 520). If the signal $V_{R1}$ has not reached an output level of 90% of the rated output within 100 ms., the controller will stop switching (block 554) FIG. 9C, turn off the power (block 556) and turn on a LED display (block 558) for 20 seconds (block 560).

If the output voltage $V_{RI}$ has reached 90% of the rated output voltage within 100 ms. (block 524), the controller continues its soft start operation (block 536), raises the signal PFS (FIG. 1A) (block 538) and initiates a regulation mode of operation (block 540). If such a condition does not exist, the controller will increase the switching frequency of the transistors by 5% of the duty cycle (block 524) and check to see if an overcurrent condition exists (block 526). If the condition does not exist, the checking sequence is repeated until an overcurrent condition does exist at which time the controller will switch the transistors at a minimum switching frequency (block 528) until the overcurrent condition is removed (block 530). At this time, the controller will check (block 532) to see if the switching of the transistors is at a frequency rate of 45% of the duty cycle (block 532). If the switching frequency has not reached this level, the switch frequency is incremented by the rate $\Delta DC$ (block 524) which in the present embodiment is 5% until it reaches 45% duty cycle (block 534) or until the output voltage of the power supply has reached 90% of its rated output (block 522) at which time the controller will go into its regulation mode (block 540) (FIG. 9B).

During the regulation of the power supply, the controller checks the output signals from the signal conditioner 88 (FIG. 1A) to see if an overvoltage condition (block 550) or a catastrophic failure of a component (block 552) exists. If it finds that any of these conditions exist, the controller will stop switching the signals $\emptyset_1$ and $\emptyset_2$ (block 554), display the location of the fault in a LED display (not shown) (block 556) for a period of 20 seconds (block 558). After this time, the display will be turned off and the operation ended (block 560).

If the controller fails to sense any of the above conditions, the controller will check the PLS signal received over line 112 (FIG. 1A) to determine if the power output level is less than 78% of the normal output (block 564) (FIG. 9C). If such a condition exists, the controller will lower the signal PFS (block 566) over conductor 114 (FIG. 1A) resulting in the shutdown of the system (block 560). If none of the above conditions exists, will check for the presence of an overcurrent condition (block 568). If such a condition exists, the controller will switch the control signals $\emptyset_1$ and $\emptyset_2$ at a 5% minimum duty cycle (block 570) so long as such a condition exists. Once this condition is removed, the controller will return to a normal regulation mode (block 540) (FIG. 9B). Reference should be made to the previously cited co-pending application of Khamare et al., Ser. No. 242,788 for a complete disclosure of the operation of the fault latches and the LED display used in identifying the cause of the shutdown of the power supply.

The IC circuits disclosed in this application are commercially available from the following manufacturers. Those circuits having the prefix MC are available from the Motorola Corporation of Phoenix, Ariz.; the prefix CD from RCA Corporation of New York, N. Y.; the prefix MP from Micro Power Systems of Santa Clara, Calif. and the prefix LM from National Semiconductor Corporation of Santa Clara, Calif.

While the principles of the invention have now been made clear in the illustrated embodiment, it will be obvious to those skilled in the art that many modifications in structure, arrangement, elements and components can be made which are particularly adapted for specific environments and operation requirements without departing from these principles. The appended claims are therefore intended to cover and embrace any such modification, within the limits only of the true spirit and scope of the invention.

We claim:

1. In a power supply comprising an input circuit, an output circuit and switching means coupling the input and output circuits when enabled, means for generating pulse-width modulated control signals enabling the operation of said switching means includes:

means for sampling the voltage level of said output circuit;

first means for generating a first digital value for each voltage sample;

second means for generating a second digital value representing the difference between succeeding first digital values;

first adding means receiving a third digital value representing the standard pulse-width modulated control signal for the required power output of the power supply, said adding means connected to said second generating means for adding said second and third digital values to output a fourth digital value;

and third means connected to said switching means and said first adding means for generating a pulse-width modulated control signal in accordance with said fourth digital values.

2. The power supply of claim 1 in which said power supply further includes:
a first selecting means receiving a fifth digital value representing the maximum width allowable of the pulse-width modulated control signal and a sixth digital value representing the minimum width allowed of the modulated control signal;
and first sensing means for outputting a first control signal representing the current level of the output circuit, said sensing means coupled to said first selecting means for enabling said selecting means to output either of said fifth or sixth digital values in accordance with the current level of the output circuit.

3. The power supply of claim 2 in which said second means further includes:
subtracting means receiving the output of said first means for subtracting the first digital values of the present sample from the first digital value from the previous sample;
second selecting means connected to said subtracting means and said first selecting means;
and comparator means comparing the output digital value of said subtracting means and said first selecting means, said comparator means connected to said second selecting means for enabling said selecting means to output said second digital value as the digital value whose value is between the fifth and sixth digital value.

4. The power supply of claim 3 in which said third generating means includes:
second adding means receiving the fourth digital value from said first adding means;
logic means connected to said second adding means for cyclically generating a plurality of seventh digital values enabling said second adding means to add the seventh digital value to said fourth digital value;
and second sensing means for sensing the output of said switching means to output a second control signal to said second adding means upon the output of said switching means reaching a predetermined level enabling said second adding means to add the two's complement of said seventh digital value to said fourth digital value.

5. The power supply of claim 4 in which said third generating means includes:
a source of first and second clock signals;
third selecting means coupled to the output of said second adding means and receiving said first and second clock signals;
and means for outputting a manually-generated control signal connected to said third selecting means enabling the selecting means to output the digital values received from said second adding means at a rate equal to one of the frequencies of said first or second clock signals.

6. The power supply of claim 5 in which said third generating means further includes counter means connected to said third selecting means and enabled by the output digital values from said third selecting means to generate a pulse-width modulated control signal in accordance with the level of said digital value outputted by said third selecting means.

7. In a power supply comprising an input circuit, an output circuit and first and second switching members coupling said input and output circuits when enabled, a controller for generating a pulse-width modulated control signal enabling the operation of said switching members including:
means for generating a plurality of analog signals representing samples of the voltage level of said output circuit;
first logic circuit means coupled to said analog signal generating means to convert said analog signal to first digital signals;
second logic circuit means connected to said first logic circuit means for generating second digital signals representing the difference between succeeding samples of the voltage level of said output circuit;
first adding means receiving third digital signals representing a pulse-width modulated control signal for the required power output of the power supply, said adding means connected to said second logic circuit means for adding the second and third digital signals to output fourth digital signals;
and third logic circuit means connected to said first adding means and including counter means enabled by said fourth digital signals to generate a pulse-width modulated control signal whose width is equal to the value of said fourth digital signals.

8. The power supply of claim 7 in which said second logic circuit means includes:
first storage means for storing the previous output of said first logic circuit means;
and second adding means connected to said first logic circuit means and said first storage means for algebraically adding the present and previous output of said first logic circuit means to generate said second digital signals.

9. The power supply of claim 8 which further includes:
first selecting means receiving fifth digital signals representing the maximum allowable width of the pulse-width modulated control signals and sixth digital signals representing the minimum allowable width of the modulated control signals;
and detecting means connected to said output circuit for generating a first control signal when the current level in said output circuit exceeds a threshold value and a second control signal when the current level is below the threshold value, said detecting means connected to said selecting means for outputting said first and second control signals enabling said selecting means to output either of said fifth and sixth digital signals in response to receiving either of said first and second control signals.

10. The power supply of claim 9 in which said second logic circuit means further includes a second counter means connected to said first selecting means for outputting a plurality of counts representing said fifth digital signals, said counter means enabled upon the start of the power supply operation to output said counts whose value incrementally increases until it equals the value of said sixth digital signals.

11. The power supply of claim 10 in which said second logic circuit means further includes:
comparator means connected to said second adding means and said first selecting means for outputting a third control signal in response to comparing said second digital values with either of said fifth and sixth digital values;

and second selecting means connected to said first adding means and first selecting means and enabled by said third control signal to output said second digital signals having a value between the values of said fifth and sixth digital signals.

12. The power supply of claim 11 in which said third logic circuit means includes:

third adding means connected to said first adding means for receiving said fourth digital signals;

said detecting means includes means for sensing the output of said first and second switching means;

fourth logic circuit means connected to said sensing means for generating said first and second control signals when the output of said switching means reaches a first and second predetermined value, respectively;

a source of clock signals;

and fifth logic circuit means connected to said third adding means and receiving said first and second control signal and said clock signals, said fifth logic circuit means outputting seventh digital signals and first and second operating signals to said third adding means whereby said seventh digital signals are added to said fourth digital signals upon the generation of said first control signal and adding the two's complement of said seventh digital signal upon the generation of said second control signal enabling the output of said switching members to remain within said first and second predetermined values.

13. The power supply of claim 12 in which said third logic circuit means includes:

a source of first timing pulses;

a source of second timing pulses;

means for outputting a manually-generated selecting signal;

and third selecting means connected to said third adding means and receiving said first and second timing pulses, said third selecting means enabled by said selecting signal to output said fourth digital signals at a rate equal to the frequency of one of said first and second timing pulses.

14. The power supply of claim 13 in which said third logic circuit means further includes:

a plurality of bi-stable logic devices operated to generate said pulse-width modulated control signals, and said counter means includes an up/down counter connected to said bi-stable devices, said counter being preset by said fourth digital signals to disable said bi-stable devices upon counting down to zero, thereby controlling the width of the pulse-width modulated control signal.

15. In a power supply having an input circuit, an output circuit and transistor switching members coupling said circuit when enabled, a method for regulating the time the transistor switching members are enabled in response to variations in the power output levels of the output circuit comprising the steps of:

sampling the voltage level of the output circuit;

converting the voltage samples to first digital signals;

generating second digital signals representing the difference between succeeding voltage samples;

setting the value of the second digital signals between maximum and minimum limits;

generating fourth digital signals by adding the second digital signal to third digital signals representing the time the transistor switching members are enabled to generate the normal voltage level of the output circuit;

cyclically adjusting the value of said fourth digital signal to force the value of the fourth digital signal to oscillate between a maximum and minimum value;

and converting the present value of the fourth digital signal into the time the transistor switching members are enabled.

16. The method of claim 15 which further includes the steps of adjusting the rate that said fourth digital signals are converted into the time the transistor switching members are enabled to one of a plurality of rate levels.

17. In a power supply including an input circuit, an output circuit, first and second switching members driving opposite sides of an input winding of an output transformer when enabled, means for generating pulse-width modulated control signals for enabling said switching transistor members comprising:

first means for generating a first digital value representing the change in the voltage level output of the output circuit;

means for sensing the output level of said first and second transistor switching members;

second means for generating a first control signal upon the output level of said first and second transistor switching members reaching a first threshold level;

a source of clock pulses;

adding means connected to said first means for receiving said first digital values;

logic means connected to said second means and said source of clock pulses, said logic means enabled by said first control signal and said clock pulses to output a second digital value and a second control signal to said adding means enabling said adding means to add the second digital value to the first digital value, thereby incrementally outputting a continuously increasing third digital value;

and means for converting the third digital value of said adding means to a pulse-width modulated control signal for reversing the output level of said first and second transistor switching members.

18. The power supply of claim 17 in which said second means generates a third control signal upon the output level of said first and second transistor switching members reaching a second threshold level, said logic means enabled by said third control signal and said clock pulses to output a fourth digital value and a fourth control signal to said adding means enabling said adding means to add the two's complement of said second digital value to the first digital value to incrementally output a continuously decreasing third digital value.

19. The power supply of claim 18 in which said first logic means comprises a plurality of Exclusive OR logic circuits.

* * * * *